US012745198B2

(12) United States Patent
Dortschy et al.

(10) Patent No.: US 12,745,198 B2
(45) Date of Patent: Sep. 22, 2026

(54) CONFIGURING TIMING OFFSETS IN INTEGRATED ACCESS BACKHAUL (IAB) NETWORKS WITH MULTIPLE AVAILABLE TIMING MODES

(71) Applicant: Telefonaktiebolaget LM Ericsson (publ), Stockholm (SE)

(72) Inventors: Boris Dortschy, Vendelsö (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 300 days.

(21) Appl. No.: 18/570,836

(22) PCT Filed: May 25, 2022

(86) PCT No.: PCT/SE2022/050507
§ 371 (c)(1),
(2) Date: Dec. 15, 2023

(87) PCT Pub. No.: WO2022/271060
PCT Pub. Date: Dec. 29, 2022

(65) Prior Publication Data

US 2024/0284363 A1 Aug. 22, 2024

Related U.S. Application Data

(60) Provisional application No. 63/214,078, filed on Jun. 23, 2021.

(51) Int. Cl.
*H04W 56/00* (2009.01)
*H04W 76/20* (2018.01)
*H04W 88/08* (2009.01)

(52) U.S. Cl.
CPC .................. *H04W 56/0015* (2013.01); *H04W 56/0045* (2013.01); *H04W 76/20* (2018.02); *H04W 88/08* (2013.01)

(58) Field of Classification Search
CPC ............. H04W 56/0015; H04W 76/20; H04W 56/0045; H04W 88/08
See application file for complete search history.

(56) References Cited

U.S. PATENT DOCUMENTS

2020/0015316 A1* 1/2020 Islam .................... H04L 5/0094
2021/0273717 A1* 9/2021 Wigard ................. H04W 76/27
(Continued)

FOREIGN PATENT DOCUMENTS

WO 2020063405 A1 4/2020
WO 2020065037 A1 4/2020
(Continued)

OTHER PUBLICATIONS

"3GPP TS 29.281 V15.6.0", 3rd Generation Partnership Project; Technical Specification Group Core Network and Terminals; General Packet Radio System (GPRS) Tunnelling Protocol User Plane (GTPv1-U) (Release 15), Sep. 2019, pp. 1-32.
(Continued)

*Primary Examiner* — Michael J Moore, Jr.
(74) *Attorney, Agent, or Firm* — Murphy, Bilak & Homiller, PLLC

(57) ABSTRACT

Embodiments include methods for a first network node configured to operate as a child node of a second network node in an integrated access backhaul (IAB) network. Such methods include receiving, from the second network node, an indication (TΔ-mode) of a timing offset between the second network node's downlink (DL) transmission timing and the second network node's uplink (UL) reception timing. Such methods include determining the following based on the indication: a particular timing mode (Tmode) used for communication between the first and second network nodes, with Tmode being one of a plurality of available timing modes; and a particular timing offset (TΔ) applicable to Tmode. Such methods include adjusting the first network
(Continued)

node's DL transmission timing based on TΔ. Other embodiments include complementary methods for a second network node configured to operate as a parent node, as well as network nodes configured to perform such methods.

18 Claims, 11 Drawing Sheets

(56) References Cited

U.S. PATENT DOCUMENTS

| | | | | |
|---|---|---|---|---|
| 2021/0289495 | A1* | 9/2021 | Korhonen | H04W 72/0446 |
| 2022/0110077 | A1* | 4/2022 | Abedini | H04W 56/0045 |
| 2022/0124652 | A1* | 4/2022 | Wanuga | H04W 56/0015 |
| 2022/0369254 | A1* | 11/2022 | Miao | H04W 56/002 |
| 2022/0393724 | A1* | 12/2022 | Matsumura | H04W 16/28 |
| 2022/0394649 | A1* | 12/2022 | Miao | H04W 56/005 |
| 2022/0400505 | A1* | 12/2022 | Matsumura | H04W 72/1273 |
| 2023/0071471 | A1* | 3/2023 | Park | H04B 17/318 |
| 2023/0156644 | A1* | 5/2023 | Bi | H04W 56/0015<br>370/503 |
| 2023/0199597 | A1* | 6/2023 | Peng | H04B 7/15528<br>370/331 |
| 2023/0309032 | A1* | 9/2023 | Ghanbarinejad | H04W 56/0045 |
| 2023/0403662 | A1* | 12/2023 | Wanuga | H04W 56/0045 |
| 2024/0064675 | A1* | 2/2024 | Bi | H04W 56/00 |
| 2024/0215021 | A1* | 6/2024 | Kurita | H04W 72/0446 |
| 2024/0267855 | A1* | 8/2024 | Yuan | H04L 5/0057 |
| 2024/0284363 | A1* | 8/2024 | Dortschy | H04W 56/0045 |

FOREIGN PATENT DOCUMENTS

| | | | | |
|---|---|---|---|---|
| WO | 2021087999 A1 | 5/2021 | | |
| WO | 2021093208 A1 | 5/2021 | | |
| WO | 2021106160 A1 | 6/2021 | | |
| WO | 2021229510 A1 | 11/2021 | | |
| WO | 2022078666 A1 | 4/2022 | | |
| WO | 2022084833 A1 | 4/2022 | | |
| WO | WO-2022087419 A1 * | 4/2022 | | H04W 56/0045 |

OTHER PUBLICATIONS

"3GPP TS 38.133 V16.7.0", 3rd Generation Partnership Project; Technical Specification Group Radio Access Network; NR; Requirements for support of radio resource management (Release 16), Mar. 2021, pp. 1-479.

"3GPP TS 38.321 V16.4.0", 3rd Generation Partnership Project; Technical Specification Group Radio Access Network; NR; Medium Access Control (MAC) protocol specification (Release 16), Mar. 2021, pp. 1-157.

"3GPP TS 38.425 V15.6.0", 3rd Generation Partnership Project; Technical Specification Group Radio Access Network; NG-RAN; NR user plane protocol (Release 15), Jul. 2019, pp. 1-22.

"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.

"3GPP TS 38.211 V16.5.0", 3rd Generation Partnership Project; Technical Specification Group Radio Access Network; NR; Physical channels and modulation (Release 16), Mar. 2021, pp. 1-134.

"Other enhancements for simultaneous operation of child and parent links", 3GPP TSG RAN WG1 #106-e, e-Meeting, R1-2106618, Aug. 16-27, 2021, pp. 1-6.

"Reply LS on T_delta for IAB OTA timing alignment", 3GPP TSG RAN WG1 #99, R1-1911807, Reno, USA, Nov. 18-22, 2019, pp. 1-2.

"Timing, CLI and power control in enhanced IAB", 3GPP TSG-RAN WG1 Meeting #104-e, R1-2101696, eMeeting, Jan. 25-Feb. 5, 2021, pp. 1-17.

"3GPP TR 38.874 1.0.0", 3rd Generation Partnership Project; Technical Specification Group Radio Access Network; Study on Integrated Access and Backhaul; (Release 15), Dec. 2018, pp. 1-111.

"3GPP TS 38.473 V15.6.0", 3rd Generation Partnership Project; Technical Specification Group Radio Access Network; NG-RAN; F1 application protocol (F1AP) (Release 15), Jul. 2019, pp. 1-220.

"3GPP TS 38.213 V16.5.0,", 3rd Generation Partnership Project; Technical Specification Group Radio Access Network; NR; Physical layer procedures for control (Release 16), Mar. 2021, pp. 1-183.

"3GPP TS 38.133 V15.4.0", 3rd Generation Partnership Project; Technical Specification Group Radio Access Network; NR; Requirements for support of radio resource management (Release 15), Dec. 2018, pp. 1-876.

"3GPP TR 38.874 V16.0.0", 3rd Generation Partnership Project; Technical Specification Group Radio Access Network; NR; Study on Integrated Access and Backhaul; (Release 16), Dec. 2018, pp. 1-111.

"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.

"3GPP TR 38.874 V0.2.1", 3rd Generation Partnership Project; Technical Specification Group Radio Access Network; Study on Integrated Access and Backhaul; (Release 15), May 2018, pp. 1-19.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.

"RAN1 Chairman's Notes", 3GPP TSG RAN WG1 Meeting #96, Athens, Greece, Feb. 25-Mar. 1, 2019, pp. 1-120.

"RAN1 Chairman's Notes", 3GPP TSG RAN WG1 Meeting Ad-Hoc Meeting 1901, Taipei, Taiwan, Jan. 21-25, 2019, pp. 1-85.

"IAB OTA Timing Alignment", 3GPP RAN1-AH-1901 Meeting, R1-1900733, Taipei, Taiwan, Jan. 21-25, 2019, pp. 1-3.

Teyeb, Oumer, et al., "Integrated Access Backhauled Networks", https://arxiv.org/abs/1906.09298, Aug. 13, 2019, pp. 1-5.

* cited by examiner

CONFIGURING TIMING OFFSETS IN INTEGRATED ACCESS BACKHAUL (IAB) NETWORKS WITH MULTIPLE AVAILABLE TIMING MODES

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

BACKGROUND

Densification via the deployment of many macro or micro base stations is one way to satisfy the increasing demand for bandwidth and/or capacity in mobile networks, which is mainly driven by the increasing use of video streaming services. Due to the availability of more spectrum in the millimeter wave (mmW) band, deploying small cells that operate in this band is an attractive deployment option for these purposes. However, the normal approach of connecting the small cells to the operator's backhaul network with optical fiber can be expensive and impractical. Employing 15 wireless links for connecting the small cells to the operator's network is a cheaper and more practical alternative. One such approach is an integrated access backhaul (IAB) network where the operator can utilize part of the radio resources for the backhaul link.

In the IAB architecture, each IAB node includes both base station and a mobile terminal (MT) functionality. The base station functionality is used for downlink (DL) and uplink (UL) commutations with downstream nodes, such as other IAB nodes and user equipment (UEs, e.g., wireless devices). For example, if the downstream node is another IAB node, the base station functionality of the IAB node communicates with the MT functionality of the downstream node. More generally, MT functionality is used for communication with upstream nodes in the IAB network, including parent nodes.

In general, an IAB node can derive the DL transmission timing of its parent node from the timing advance (TΔ) configuration used in the IAB node, together with information about the timing offset between the parent node's DL transmission and UL reception. Such timing offset information can be signalled by the parent node to the (child) IAB node.

SUMMARY

However, there are many different timing configurations (also referred as "modes" or "cases") that can be employed by IAB nodes, each of which may use a different type of timing offset. This can cause an IAB node various problems, difficulties, and/or issues in relation to its timing for communication with its parent node and with UEs or child IAB nodes.

Accordingly, embodiments of the present disclosure address these and other problems, difficulties, and/or issues in wireless networks (e.g., 5G networks) comprising IAB nodes, thereby facilitating the otherwise-advantageous deployment of IAB solutions.

Some embodiments of the present disclosure include methods (e.g., procedures) for a first network node configured to operate as a child node of a second network node in an IAB network.

These exemplary methods can include receiving, from the second network node, an indication (TΔ-mode) of a timing offset between the second network node's downlink (DL) transmission timing and the second network node's uplink (UL) reception timing. For example, the indication can be received in a medium access control (MAC) control element (CE). These exemplary methods can also include determining the following based on the indication:

- a particular timing mode (Tmode) used for communication between the first and second network nodes, wherein Tmode is one of a plurality of available timing modes; and
- a particular timing offset (TΔ) that is applicable to Tmode.

These exemplary methods can also include adjusting the first network node's DL transmission timing based on TΔ.

In some embodiments, determining Tmode includes determining that Tmode is a first one of the available timing modes when a function of TΔ, f(TΔ), is less than a threshold. In some of these embodiments, determining Tmode also includes determining that Tmode is a second one of the available timing modes when f(TΔ) is not less than the threshold. In some of these embodiments, the first available timing mode is Case-1 and the second available timing mode is either Case-6 or Case-7. In other of these embodiments, the first available timing mode is Case-6 and the second available timing mode is either Case-1 or Case-7.

In other embodiments, the indication includes first and second portions, the first portion indication indicates TΔ, and at least one of the first and second portions indicates Tmode. In some cases, the first and second portions can be disjoint. In some of these embodiments, the plurality of available timing modes include the first available timing mode and at least two other available timing modes. In such embodiments, determining includes the following operations:

- determining that Tmode is the first available timing mode when a function of TΔ, f(TΔ), is less than a threshold; and
- when f(TΔ) is not less than the threshold, determining that Tmode is one of the at least two other available timing modes and selecting Tmode from the at least two other available timing modes based on the second portion of the indication.

For example, the first available timing mode is Case-1 and the at least two other available timing modes include Case-6 and Case-7. As another example, the first available timing mode is Case-6 and the at least two other available timing modes include Case-1 and Case-7.

In some embodiments, the function of TΔ, f(TΔ), is equal to TΔ. In some embodiments, the threshold can be preconfigured in the first network node and the second network node, e.g., based on a 3GPP specification. In other embodiments, the threshold can be received by the first network node from the second network node, e.g., via RRC.

In some embodiments, the adjusting operations can include determining a timing advance value (TAmode), associated with Tmode, for the first network node's UL transmission timing relative to the first network node's DL reception timing, and setting the first network node's DL transmission timing in advance of the first network node's DL reception timing based on a function of TAmode.

In some embodiments, Tmode is determined to be Case-6 and these exemplary methods can also include adjusting the first network node's UL transmission timing to align with the first network node's DL transmission timing. In some of these embodiments, these exemplary methods can also include performing an UL transmission to the second network node based on the adjusted UL transmission timing.

Other embodiments include methods (e.g., procedures) for a second network node configured to operate as a parent node of a first network node in an IAB network. In general, these exemplary methods can be complementary to the exemplary methods for the first network node, summarized above.

These exemplary methods can include sending, to the first network node, an indication (TΔ-mode) of a timing offset between the second network node's DL transmission timing and the second network node's UL reception timing. The indication can include a representation of the following:

- a particular timing mode (Tmode) used for communication between the first and second network nodes, wherein Tmode is one of a plurality of available timing modes; and
- a particular timing offset (TΔ) that is applicable to Tmode.

In some embodiments, the indication can be sent in a MAC CE. In some embodiments, these exemplary methods can also include performing at least one DL transmission to the first network node and receiving at least one UL transmission from the first network node based on TΔ and Tmode.

In some embodiments, the indication indicates that Tmode is a first one of the available timing modes based on a function of TΔ, f(TΔ), being less than a threshold. In some of these embodiments, the indication indicates that Tmode is a second one of the available timing modes based on f(TΔ) being not less than the threshold. In some of these embodiments, the first available timing mode is Case-1 and the second available timing mode is either Case-6 or Case-7. In other of these embodiments, the first available timing mode is Case-6 and the second available timing mode is either Case-1 or Case-7.

In other embodiments, the indication includes first and second portions, the first portion indication indicates TΔ, and at least one of the first and second portions indicates Tmode. In some cases, the first and second portions can be disjoint. In some of these embodiments, the plurality of available timing modes include the first available timing mode and at least two other available timing modes. In such embodiments, when a function of TΔ, f(TΔ), is less than a threshold, the first portion indicates that Tmode is the first available timing mode, and when f(TΔ) is not less than the threshold, the second portion indicates one of the at least two other available timing modes as Tmode. For example, the first available timing mode is Case-1 and the at least two other available timing modes include Case-6 and Case-7. As another example, the first available timing mode is Case-6 and the at least two other available timing modes include Case-1 and Case-7.

In some embodiments, the function of TΔ, f(TΔ), is equal to TΔ. In some embodiments, the threshold can be preconfigured in the first network node and the second network node, e.g., based on a 3GPP specification. In other embodiments, the threshold can be sent by the second network node to the first network node, e.g., via RRC.

In some embodiments, these exemplary methods can also include determining TΔ based on a function of the second network node's DL transmission timing and of the second network node's UL reception timing.

Other embodiments also include network nodes (e.g., IAB nodes and/or components thereof) configured to perform operations corresponding to any of the exemplary methods described herein, as well as IAB networks including such nodes. Other embodiments also include non-transitory, computer-readable media storing computer-executable instructions that, when executed by a processing circuit of such network nodes, configure the same to perform operations corresponding to any of the exemplary methods described herein.

These and other embodiments described herein can avoid misinterpretation of the timing information provided by a parent node to a child node, and consequently avoid erroneous adjustments of the child node's UL and/or DL transmission timing based on such timing information. Accordingly, such techniques facilitate proper operation of an IAB network when multiple timing modes are available for and/or in use.

These and other objects, features and advantages of the present disclosure will become apparent upon reading the following Detailed Description in view of the Drawings briefly described below.

DETAILED DESCRIPTION

Figure 1:
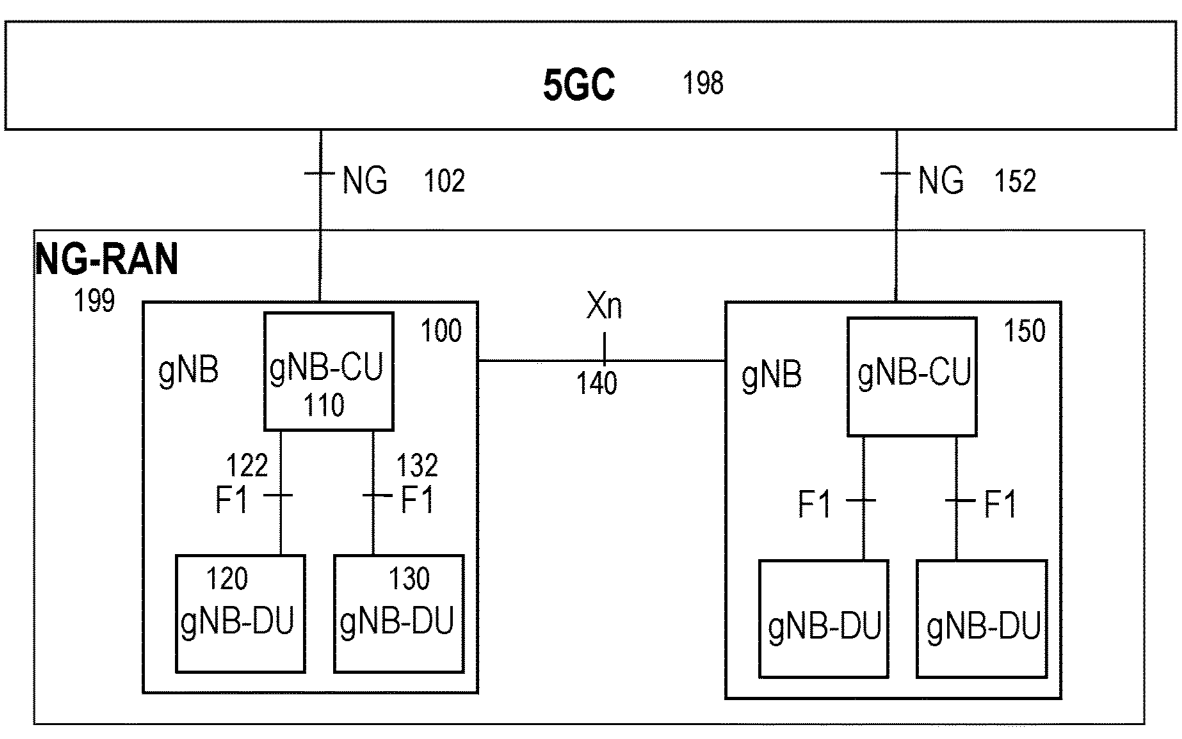
FIG. 1 illustrates a high-level view of an exemplary 5G network architecture, including split central unit (CU)-distributed unit (DU) split architecture of gNBs.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. Examples are provided that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.
- Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.
- Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.
- Radio Node: As used herein, a "radio node" can be either a "radio access node" (or equivalent term) or a "wireless device."
- Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.
- Node: As used herein, the term "node" (without any prefix) can be any type of node that is capable of operating in or with a wireless network (including a RAN and/or a core network), including a radio access node (or equivalent term), core network node, or wireless device.
- IAB node: As used herein, the term "IAB node" refers to a network node that includes radio access node functionality (e.g., of a distributed unit) for downstream communication in an IAB network as well as wireless device functionality (e.g., of a mobile terminal) for upstream communication in the IAB network.
- Upstream and downstream: As used herein with respect to communication in an IAB network, "upstream" refers to the direction towards a donor gNB and "downstream" refers to the direction away from a donor gNB.
- Parent Node: As used herein, the term "parent node" (or "parent IAB node") refers to a network node immediately upstream from a particular IAB node in an IAB network (e.g., an IAB node one hop closer to a donor gNB). Even so, a parent node may be only one of the network nodes upstream from the particular IAB node in the network, e.g., if there are multiple hops to a donor gNB.
- Ancestor Node: As used herein, the term "ancestor node" refers to any network node upstream from a particular IAB node (e.g., towards a donor gNB) in an IAB network, including a parent node.
- Child node: As used herein, the term "child node" (or "child IAB node') refers to a network node immediately downstream from a particular IAB node (e.g., an IAB node one hop further from a donor gNB) in an IAB network. Even so, a child node may be only one of the network nodes downstream from the particular IAB node in the network, e.g., if there are multiple hops to served UEs.
- Descendant Node: As used herein, the term "descendant node" refers to any network node downstream from a particular IAB node (e.g., away from a donor gNB) in an IAB network, including a child node.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

As mentioned above, there are many different timing configurations (also referred as "modes" or "cases") that can be employed by the parent node, each of which may use a different type of timing offset. This can cause the (child) IAB node various problems, difficulties, and/or issues in relation to establishing its timing for communication with the parent node and with UEs or child IAB nodes. This is discussed in more detail below.

IAB has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, including Session Management Function(s) (SMF).

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region".

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Furthermore, the F1 interface between the gNB-CU and gNB-DU is specified and/or based on the following general principles:

- F1 is an open interface;
- F1 supports the exchange of signalling information between respective endpoints, as well as data transmission to the respective endpoints;
- from a logical standpoint, F1 is a point-to-point interface between the endpoints (even in the absence of a physical direct connection between the endpoints);
- F1 supports control plane and user plane separation into respective F1-AP protocol and F1-U protocol (also referred to as NR User Plane Protocol), such that a gNB-CU may also be separated in CP and UP;
- F1 separates Radio Network Layer (RNL) and Transport Network Layer (TNL);
- F1 enables exchange of user equipment (UE) associated information and non-UE associated information;
- F1 is defined to be future proof with respect to new requirements, services, and functions;

A gNB terminates X2, Xn, NG and S1-U interfaces and, for the F1 interface between DU and CU, utilizes the F1-AP protocol that is defined in 3GPP TS 38.473 (v15.6.0).

In addition, the F1-U protocol is used to convey control information related to the user data flow management of data radio bearers, as defined in 3GPP TS 38.425 (v15.6.0). The F1-U protocol data is conveyed by the GTP-U protocol, more specifically by the "RAN Container" GTP-U extension header as defined in 3GPP TS 29.281 (v15.6.0). In other words, the GTP-U protocol over user datagram protocol (UDP) over Internet Protocol (IP) carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

A CU can host protocols such as RRC and PDCP, while a DU can host protocols such as RLC, MAC and PHY. In other variants, the RLC protocol can be split between CU and DU, with Automatic Retransmission Request (ARQ) functionality in CU. In other variants, a CU can host RRC and PDCP, where PDCP handles both UP (e.g., PDCP-U) and CP (e.g., PDCP-C) traffic.

Figure 2:
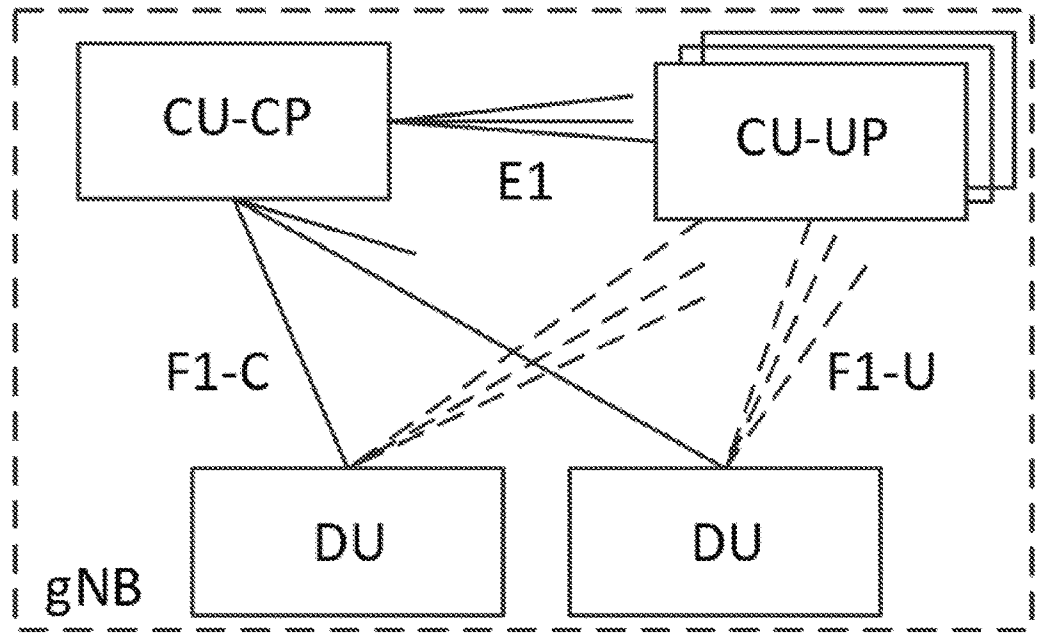
FIG. 2 illustrates the control-plane (CP) and user-plane (UP) interfaces within the split CU-DU architecture shown in FIG. 1.

Furthermore, centralized control plane protocols (e.g., PDCP-C and RRC) can be hosted in a different CU than centralized user plane protocols (e.g., PDCP-U). In particular, it has also been agreed in 3GPP RAN3 Working Group (WG) to support a separation of the gNB-CU into a CU-CP function (including RRC and PDCP for signaling radio bearers) and CU-UP function (including PDCP for user plane). FIG. 2 shows an exemplary gNB architecture that includes two DUs, a CU-CP, and one or more CU-UPs. As shown in FIG. 2, a single CU-CP can be associated with multiple CU-UPs in a gNB. The CU-CP and CU-UP communicate with each other using the E1-AP protocol over the E1 interface, as specified in 3GPP TS 38.463 (v15.4.0). Furthermore, the F1 interface between CU and DU (see FIG. 1) is functionally split into F1-C between DU and CU-CP and F1-U between DU and CU-UP. Three deployment scenarios for the split gNB architecture shown in FIG. 2 are defined in 3GPP TR 38.806 (v15.0.0):

Scenario 1: CU-CP and CU-UP centralized;

Scenario 2: CU-CP distributed and CU-UP centralized;

Scenario 3: CU-CP centralized and CU-UP distributed.

Prior to Rel-13, there were two RRC states defined for a Long-Term Evolution (LTE) UE. More specifically, after a UE is powered ON it will be in the RRC_IDLE state until an RRC connection is established, at which time it will transition to RRC_CONNECTED state (e.g., where data transfer can occur) After a connection is released, the UE returns to RRC_IDLE in which the UE's radio is active on a discontinuous reception (DRX) schedule configured by upper layers. During DRX active periods, an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

In LTE Rel-13, a mechanism was introduced for the UE to be suspended by the network in a state similar to RRC_IDLE but with some differences. First, the suspended condition is not a third RRC "state" alongside RRC_IDLE and RRC_CONNECTED; rather it can be viewed as a "substate" of RRC_IDLE. Second, both the UE and the serving eNB store the UE's AS (e.g., S1-AP) context and RRC context after suspension. When the suspended UE needs to resume a connection (e.g., to send UL data), instead of going through the conventional service request procedure, the suspended UE merely sends an RRCConnectionResumeRequest message to the eNB. The eNB resumes the S1AP context and responds with a RRCConnectionResume message. There is no elaborate exchange of security context between MME and eNB and no setup of AS security context. The preserved AS and RRC contexts are merely resumed from where they were suspended earlier. Reducing the signaling can provide reduced UE latency (e.g., for smart phones accessing Internet) and reduced UE signaling, which can lead to reduced UE energy consumption, particularly for machine type communication (MTC) devices that send very little data (i.e., signaling being a primary consumer of energy).

In addition to the RRC_IDLE and RRC_CONNECTED states, NR UEs also support an RRC_INACTIVE state with similar properties as the suspended condition in LTE Rel-13. Even so, the RRC_INACTIVE state has slightly different properties in that it is a separate RRC state and not part of RRC_IDLE as in LTE. Additionally, the CN/RAN connection (NG or N2 interface) is kept alive during RRC_INACTIVE while it was suspended in LTE.

Figure 3:
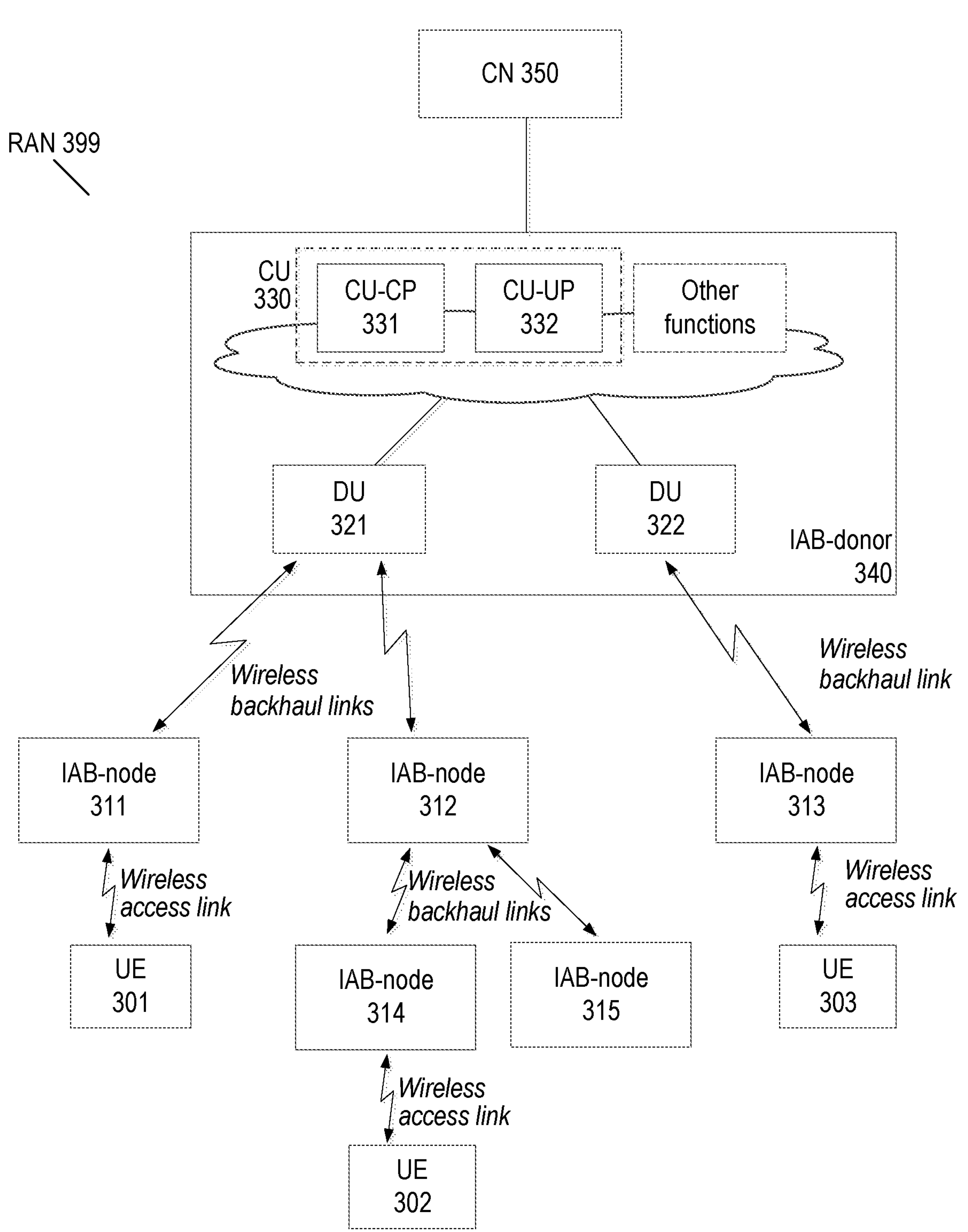
FIG. 3 shows a reference diagram for an IAB network in standalone mode.

FIG. 3 shows a reference diagram for an IAB network in standalone mode, as further explained in 3GPP TR 38.874 (version 0.2.1). The IAB network shown in FIG. 3 includes one IAB-donor 340 and multiple IAB-nodes 311-315, all of which can be part of a radio access network (RAN 399) such as an NG-RAN. IAB donor 340 includes DUs 321, 322 connected to a CU 330, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of a wireless backhaul link towards a corresponding upstream (or "ancestor") DU function. This MT functionality is similar to functionality that enables UEs to access the IAB network and, in fact, has been specified by 3GPP as part of the Mobile Equipment (ME). However, IAB functionality is transparent to UEs, such that UEs are unaware if they are being served by a conventional gNB or an IAB-donor gNB via one or more intermediate IAB nodes.

In the context of FIG. 3, upstream DUs can include either DU 321 or 322 of IAB donor 340 and, in some cases, a DU function of an intermediate IAB node that is "downstream" (or "descendant") from IAB donor 340. As a more specific example, IAB-node 314 is downstream from IAB-node 312 and DU 321, IAB-node 312 is upstream from IAB-node 314 but downstream from DU 321, and DU 321 is upstream from IAB-nodes 312 and 314. The DU functionality of IAB nodes 311-315 also terminates the radio interface layers of wireless access links towards UEs (e.g., for network access via the DU) and wireless backhaul links towards other downstream IAB nodes. Accordingly, IAB-nodes 311, 313, and 314 can be considered "access IAB nodes" for UEs 301, 303, and 302, respectively, and that term will be used in the same manner hereinafter.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In general, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

Figures 4, 5:
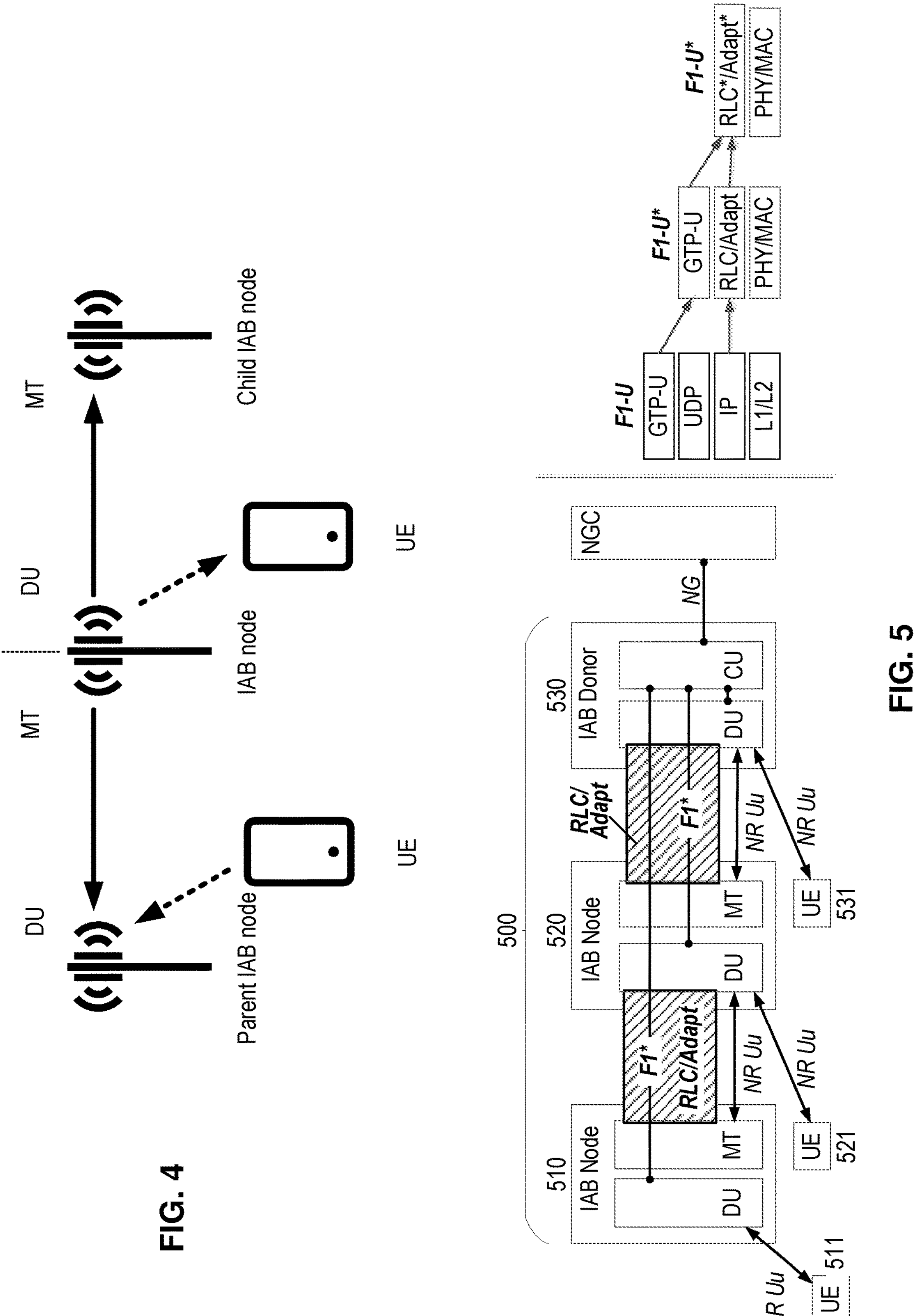
FIG. 4 shows a high level view of relationships between a parent IAB node, a IAB node, and a child IAB node.
FIG. 5 shows a block diagram of an IAB reference architecture based on the CU/DU split architecture shown in FIG. 1.

FIG. 4 shows a high level view of relationships between a parent IAB node, a IAB node, and a child IAB node. Note that the terms "parent" and "child" are used the relationships of other nodes to the IAB node shown in the middle of the figure. The parent IAB node's DU communicates with the MT of the IAB node via a backhaul link and with a UE via an access link. The IAB node's DU communicates with the MT of the child IAB node via a backhaul link and with another UE via an access link.

3GPP TS 38.874 (v16.0.0) specifies several reference architectures for supporting user plane (UP) traffic over IAB nodes, including IAB Donor nodes. FIG. 5 shows a block diagram of an exemplary IAB network 500 that is based on a reference architecture "la", which leverages the CU/DU split architecture in a two-hop chain of IAB nodes underneath an IAB-donor. In this exemplary architecture, the IAB-nodes and UEs connect in standalone (SA) mode to an NGC.

In this architecture, each IAB node 510-520 of IAB network 500 includes a DU and a mobile terminal (MT). The MT function was previously defined as a component of the Mobile Equipment. In the context of IAB, however, MT is an IAB node function that terminates the radio interface layers of the backhaul Uu interface towards a parent node, such as an IAB donor or another IAB node. For example, IAB donor 530 is a parent node for IAB node 520, which in turn is a parent node for IAB node 510. Even though an IAB node can connect to more than one parent node. Although each IAB-node may contain multiple DUs, each DU of the IAB-node has F1-C connection to only one IAB-donor CU-CP.

With their respective DU functionality, IAB nodes 510-520 establish RLC channels to respective UEs 511-521 and, in the case of IAB node 520, to an MT of downstream IAB node 510. For MTs, this RLC channel may refer to a modified RLC*. The IAB Donor also includes a DU to support UEs (e.g., 531) and MTs of downstream IAB nodes (e.g., 520). The IAB-donor holds a CU for the DUs of all IAB-nodes and for its own DU. It is assumed that the DUs on an IAB-node are served by only one IAB-donor. This IAB-donor may change through topology adaptation.

Each DU on an IAB-node connects to the CU in the IAB-donor using a modified form of the F1 interface, referred to as F1*. The F1*-U (user plane) runs over RLC channels on the wireless backhaul between the MT on the serving IAB-node and the DU on the donor. F1*-U transport between MT and DU on the serving IAB-node as well as between DU and CU on the donor is for further study. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. More generally, in the architecture show in FIG. 5, information carried on the adaptation layer supports the following functions:

- Routing across the wireless backhaul topology,
- QoS-enforcement by the scheduler on DL and UL on the wireless backhaul link,
- Mapping of UE user-plane PDUs to backhaul RLC channels, and
- Identification of the UE-bearer for each PDU.

The right side of FIG. 5 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM. Details of F1* the adaptation layer, RLC*, hop-by-hop forwarding, and transport of F1-AP are for further study. Protocol translation between F1* and F1 in case the IAB-donor is split is also for further study.

3GPP TR 38.874 (v16.0.0) defines the following "cases" of transmission timing alignment within an IAB node and/or with respect to a parent node (e.g., a parent IAB node or donor DU):

- Case-1: DL transmission timing alignment across IAB nodes and donors:
- Case-2: DL and UL transmission timing is aligned within an IAB node.
- Case-3: DL and UL reception timing is aligned within an IAB node.
- Case-4: within an IAB node, using Case-2 when transmitting and Case-3 when receiving.
- Case-5: within an IAB-node, using Case-1 for access link timing and Case-4 for backhaul link timing in different time slots.
- Case-6: Case-1 for DL transmission timing and Case-2 for UL transmission timing, and:
  - DL transmission timing for all IAB nodes is aligned with the parent IAB-node or donor DL timing.
  - IAB node's UL and DL transmission timing can be aligned.
- Case-7: Case-1 for DL transmission timing and Case-3 for UL reception timing, and:
  - DL transmission timing for all IAB-nodes is aligned with the parent IAB-node or donor DL timing.
  - IAB node's UL reception timing and DL reception timing can be aligned.

Figures 6, 7:
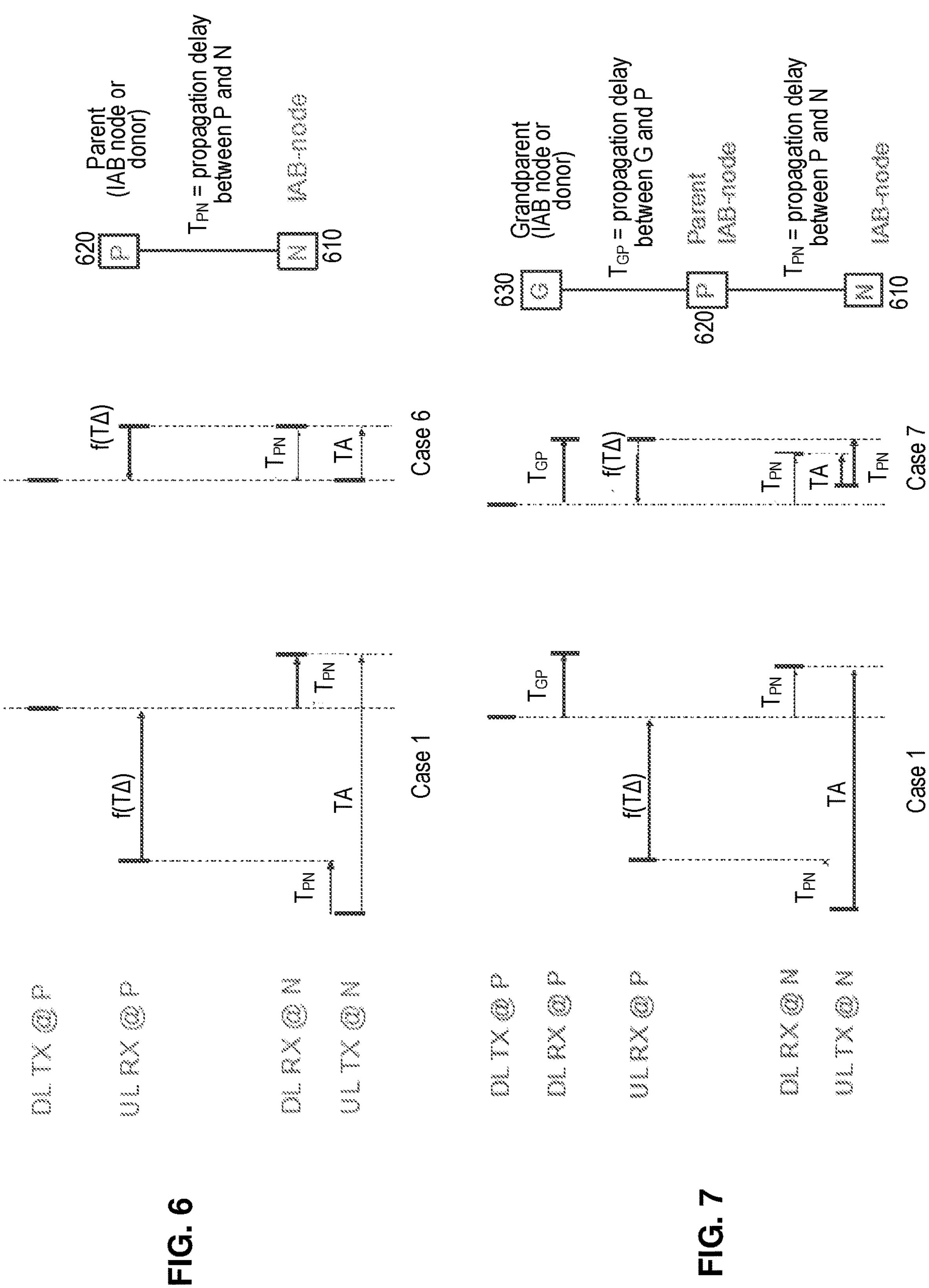
FIG. 6 shows exemplary timing relations between an IAB node and a parent node for when the IAB node is operating in Case-1 and Case-6 timing configurations.
FIG. 7 shows exemplary timing relations between an IAB node, a parent node, and a grandparent node when the IAB node is operating in Case-1 and Case-7 timing configurations.

FIG. 6 shows exemplary timing relations between an IAB node (610, 1500) and a parent node (620, e.g., a parent IAB node or donor DU) for when the IAB node is operating in Case-1 (left) and Case-6 (right) timing configurations (also referred to as "modes"). If the IAB node (denoted "N") is operating in Case-6, the parent node (denoted "P") has a different relation between its UL reception timing and its DL transmission timing as compared to when it is operating in Case-1. In the figure, this relation is denoted f(TΔ), and TΔ denotes information about this timing relation that the parent node provides to the IAB node. As such, the parent node can provide different TΔ information to the IAB node depending on whether Case-1 or Case-6 is in use. In FIG. 6, timing advance (TΔ) represents the timing offset between the IAB node's UL transmission and DL reception, which the child node can derive based on existing mechanisms or techniques.

FIG. 7 shows exemplary timing relations between the IAB node (610, 1500), the parent IAB node (620, 1500), and a grandparent node (G/630, e.g., IAB node or donor DU) for when the parent IAB node is operating in Case-1 (left) and Case-7 (right). If the parent IAB node is operating in Case-7, the parent IAB node has a different relation f(TΔ) between its UL reception timing and its DL transmission timing as compared to when it is operating in Case-1. As such, the parent IAB node can provide different TΔ information to the IAB node depending on whether Case-1 or Case-7 is in use.

3GPP TS 38.133 (v.15.4.0) defines various requirements on the cell phase synchronization, which affects the transmission timing alignment in DL transmissions over access and backhaul links. This includes transmissions from parent IAB nodes to child IAB nodes, and from IAB nodes to UEs. For time-division-duplexing (TDD) arrangements, cell phase synchronization accuracy is defined as a maximum absolute deviation in frame start timing between any pair of cells on the same frequency that have overlapping coverage areas. More specifically, the cell phase synchronization measured at antenna connectors for the respective nodes shall be less than three microseconds (3 μs).

As briefly discussed above, an IAB node can derive its parent's DL transmission timing from the (child) IAB node's TΔ configuration together with additional information—signalled from the parent IAB node—about the parent's timing alignment of DL transmission and UL reception. This additional information can include and/or be in the form of TΔ discussed above. The value of TΔ is intended to account for factors such as Tx to Rx switching time, hardware impairments, etc.

Figure 8:
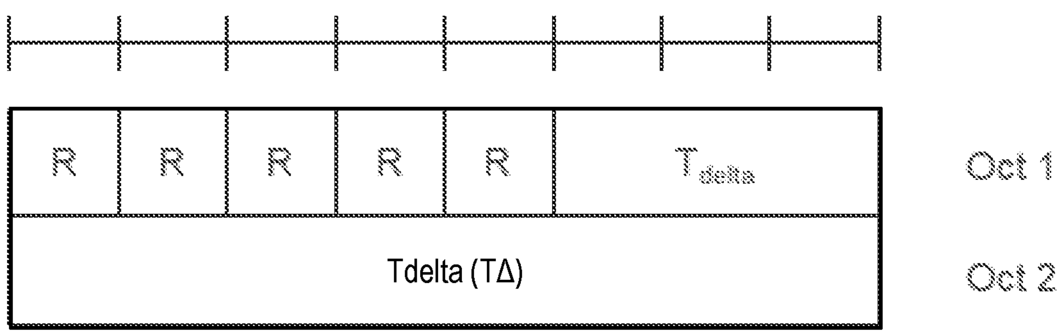
FIG. 8 shows a conventional Timing Delta MAC control element (CE).

A Timing Delta MAC control element (CE) can be used to provide the parent node's TΔ information, which can be used by the (child) IAB node to determine its timing adjustment. FIG. 8 shows an exemplary Timing Delta MAC CE. It has a fixed size of two octets (i.e., 16 bits) including five reserved (R) bits set to zero and 11 bits for the Tdelta (equivalent to TΔ) field. This latter field includes an integer value that indicates an amount of timing adjustment, as further defined in 3GPP TS 38.213 (v16.5.0). The parent node fully controls the content and signaling of the Timing Delta MAC CE.

The current maximum value of Tdelta is specified to 1199, although the 11 bits shown in FIG. 8 allow values up to 2047. Different ranges are assumed for different sub-carrier spacings (SCS), although not explicitly stated in 3GPP specifications. Further extension may be possible by using one or more of the reserved (R) bits. The range of the Tdelta field is such that the parent node's UL reception timing is always advanced relative to its DL transmission timing.

Usually, as for a Rel-15 UE UL timing control, the UL reception timing at the parent node is fairly stable in a tight range set and controlled by the parent node. A common assumption, true for most timing cases, is that the parent node's UL reception timing relative to its DL transmission timing is advanced by N_TA_offset, which is defined in 3GPP TS 38.133 (v16.7.0). Changes in UL reception are typically small relative to the UL propagation delay, mainly due to relative movements of the parent node's UL and DL transmitter and receiver.

Applicants have recognized that switching between timing configurations (e.g., between Case-1 and Case-6) results in much greater changes of an IAB-MT's UL transmission timing, e.g., on the order of N_TA_offset plus the UL propagation delay. As such, a Tdelta value signaled for Case-1 operation will no longer be valid for subsequent Case-6 operation, and vice versa. Currently, however, the Timing Delta MAC CE is only specified for use with Case-1 and it is unclear how the parent node can provide corresponding values for other cases. Accordingly, a (child) IAB node is unable to determine differentiate whether Tdelta in a MAC CE received from a parent node should be interpreted as applying to Case-1 or to another timing configuration used by the parent node.

Embodiments of the present disclosure address these and other problems, difficulties, and/or issues by techniques that facilitate an IAB node to differentiate whether received information about a relation between a parent node's UL reception timing and the parent node's DL transmission timing should be interpreted as applying to Case-1 or a different timing configuration/mode/case, and to adjust its DL transmission timing for all timing modes available for use by the IAB node and/or the parent node. These techniques can avoid misinterpretation of the timing information provided by the parent node, and consequently avoid erroneous adjustments of the IAB node's UL and/or DL transmission timing based on such timing information. Accordingly, such techniques facilitate proper operation of an IAB network when any of multiple available timing modes are in use.

Some embodiments of the present disclosure include methods for a first network node configured to operate as a child node of a second network node in an IAB network. Other embodiments include methods for a second network node configured to operate as a parent node of a first network node in an IAB network. These respective embodiments are complementary to each other and will be described in more detail below. In this description, the first network node may also be referred to as "child node" or "IAB node", while the second network node may also be referred to as "parent node".

Figure 9:
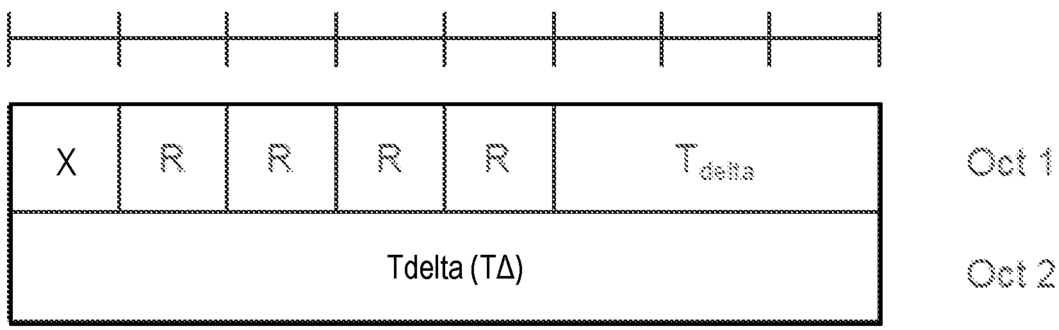
FIGS. 9-10 show two Timing Delta MAC CEs according to various embodiments of the present disclosure.
Figure 10:
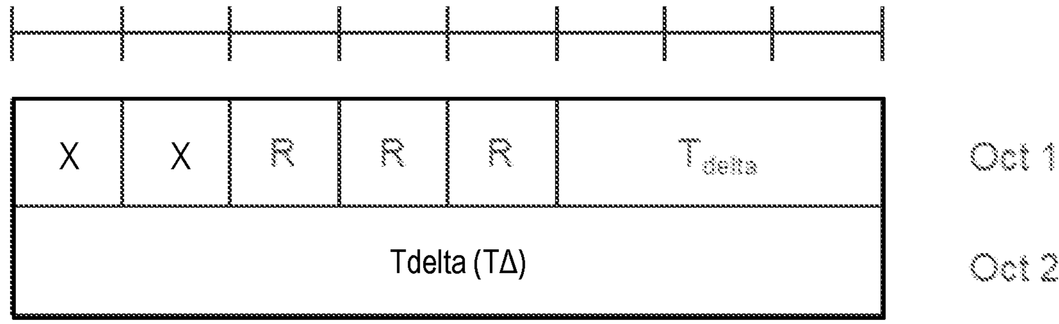

In some embodiments, the first network node can receive, from the second network node, an indication ("TΔ-mode") of a timing offset between the second network node's DL transmission timing and the second network node's UL reception timing. For example, the indication can be received as a MAC CE. Two exemplary MAC CEs that can carry such an indication are shown in FIGS. 9-10 and are described in more detail below.

In some embodiments, the indication provided by the second network node can include an encoded representation of the following:

- a particular timing mode ("Tmode") to be used for communication between the first and second network nodes, wherein Tmode is one of a plurality of available timing modes; and
- a particular timing offset ("TΔ") that is applicable to Tmode.

For example, the plurality of available timing modes can include Case-1 and one or more of Case-6 and Case-7, described above. Thus, the first network node can determine Tmode and TΔ unambiguously from the received indication, according to various embodiments described below. Additionally, the first network node can adjust is DL transmission timing based on the determined TA that is applicable to the determined Tmode.

The received indication may indicate Tmode and TΔ in various ways. In some embodiments, the indication indicates Tmode based on TΔ and a threshold, such that Tmode can be determined by the first network node based on based on comparing TΔ to the threshold. As explained above, the range of TΔ will differ between Case-1 and either Case-6 or Case-7. As shown in FIGS. 6-7, Case-1 timing is always set such that UL reception timing is ahead of the DL transmission timing at the parent node. In contrast, in either Case-6 (simultaneous transmission, FIG. 6) or Case-7 (simultaneous reception, FIG. 7), UL reception timing is after DL transmission timing, assuming that the network is synchronized.

In the above example, it is possible to distinguish between Case-1 timing and not Case-1 timing based on a threshold. More generally, if only two timing modes (e.g., Case-1+Case-6, Case-1+Case-7, etc.) are available for use in the IAB network, the particular timing mode indicated by Tmode can be unambiguously determined by the threshold comparison.

In some embodiments, the threshold can be preconfigured in the first network node and the second network node, e.g., based on 3GPP specification. In other embodiments, the second network node can provide the threshold to the first network node, e.g., via broadcast or unicast RRC message, MAC CE, etc.

In other embodiments, at least part of Tmode can be provided in a second portion of the indication that is separate from a first portion that indicates TΔ. As such, the first network node can determine Tmode based on this second portion. FIGS. 9-10 show two exemplary MAC CEs according to these embodiments, where "X" bits correspond to the second portion that indicates Tmode and "Tdelta" corresponds to the first portion.

In the arrangement shown in FIG. 9, the 1-bit X field can indicate one of two available timing modes. For example, the threshold comparison of TΔ discussed above can be used to determine Case-1 vs. not Case-1, and the value of X can be used to distinguish between two cases (e.g., Case-6 and Case-7) that are not Case-1. More generally, the threshold comparison of TΔ discussed above can be used to determine a particular timing mode vs. not the particular timing mode, and the value of X can be used to distinguish between two timing modes other than the particular timing mode.

In the arrangement shown in in FIG. 10, the two-bit X field can indicate one of up to four available timing modes. In some embodiments, this X field can indicate Tmode independently of the Tdelta field. In other words, the first network node can determine TΔ and Tmode from disjoint portions (e.g., subsets of bits) of the indication. As such, the value of X can be used to indicate Case-1, Case-6, or Case-7, and possibly one other timing mode if needed.

In other embodiments, this two-bit X field can be used in a similar manner as the one-bit X field shown in FIG. 9. For example, the threshold comparison of TΔ discussed above can be used to determine Case-1 vs. not Case-1, and the value of X can be used to distinguish between up to four cases (e.g., Case-6, Case-7, etc.) that are not Case-1. More generally, the threshold comparison of TΔ discussed above can be used to determine a particular timing mode vs. not the particular timing mode, and the value of X can be used to distinguish between four timing modes other than the particular timing mode.

In some embodiments, upon determining Tmode, the first network node can also determine a timing advance (TΔ) value associated with Tmode. In other words, the first network node can determine a TΔ value that can be applied consistent with the determined Tmode. This determined TA value can be referred to as "TAmode". Subsequently, the first network node can adjust and/or set its DL transmission (i.e., the DL transmission timing of the MT) based on a function of TAmode. An exemplary function is shown in equation (1) below:

$$f(TA_{mode}) = T_{DLRX} - \left(\frac{(TA_{mode} - N_{TA,offset})}{2} + N_{delta} + T\Delta \times G_{step}\right)T_c \quad (1)$$

The term in the outermost parentheses represents propagation delay between the first and second network nodes; N_TA_offset, N_delta, and G_step are determined as specified in 3GPP TS 38.213 (v16.5.0); and T_c is determined as specified in 3GPP TS 38.211 (v16.5.0).

In some embodiments, upon adjusting the DL transmission timing, the first network node can adjust its UL transmission timing to align with its DL transmission timing. This can be done, for example, if Tmode is Case-6 timing mode and/or in a Case-6 slot. In some embodiments, the first network node can perform an UL transmission to the second network node based on the adjusted UL transmission timing.

In some embodiments, the second network node can determine TΔ encoded in the indication sent to the first network node based on a function of its DL transmission timing ($T_{DLTX}$) and it's UL reception timing ($T_{ULRX}$). An example function is given in equation (2) below:

$$T\Delta = \frac{N_{TA,offset} - 2 \cdot N_{delta}}{2 \cdot G_{step}} - \frac{T_{DLTX} - T_{ULRX}}{2 \cdot G_{step} \cdot T_c} \quad (2)$$

The terms used in (2) have the same meanings as described above in relation to equation (1).

Figure 11:
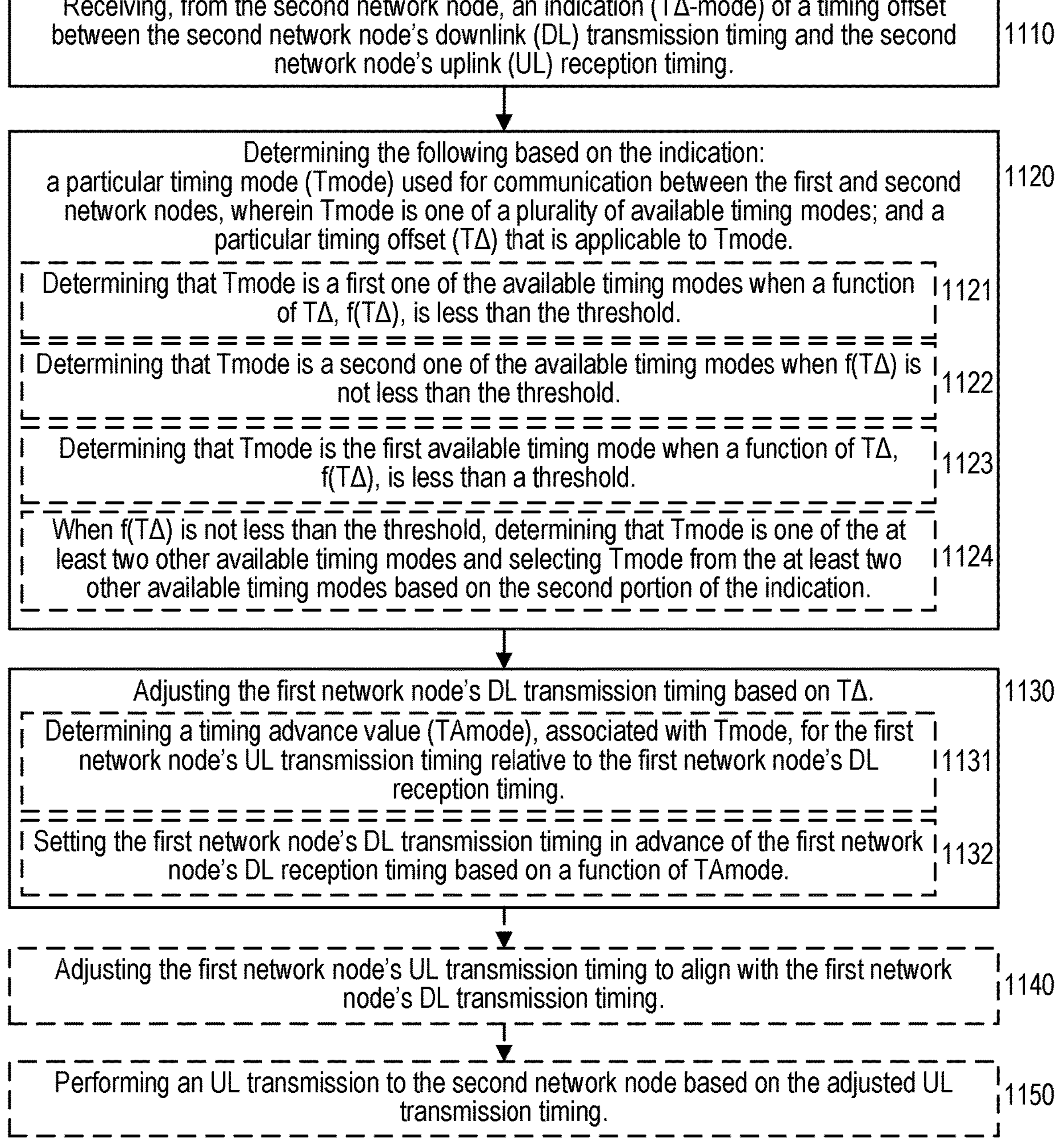
FIG. 11 illustrates an exemplary method (e.g., procedure) for a first network node in an IAB network, according to various embodiments of the present disclosure.
Figure 12:
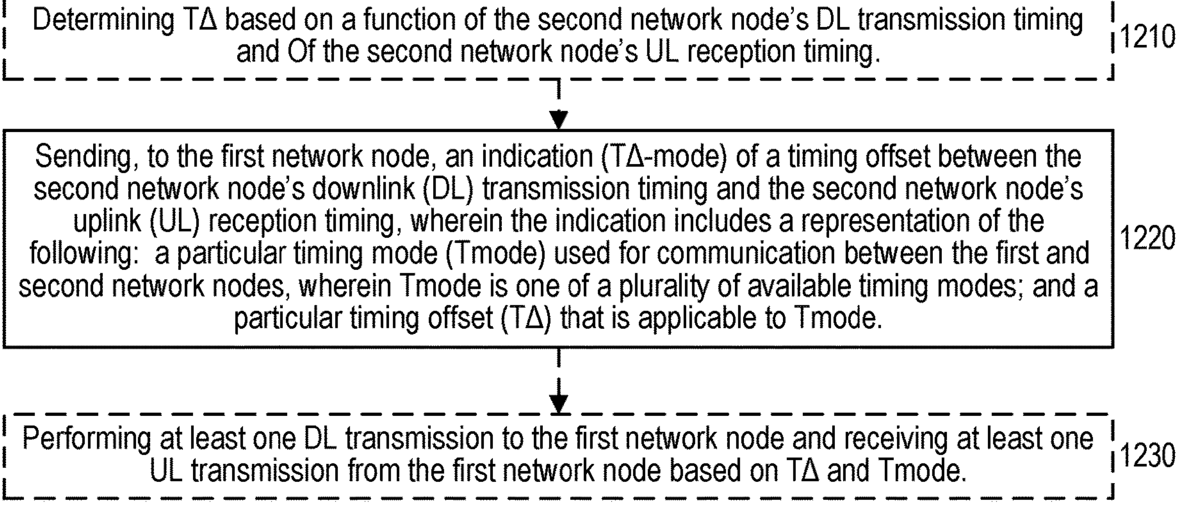
FIG. 12 illustrates an exemplary method (e.g., procedure) for a second network node in an IAB network, according to various embodiments of the present disclosure.

The embodiments described above can be further illustrated with reference to FIGS. 11-12, which show exemplary methods (e.g., procedures) for a first network node and a second network node, respectively. In other words, various features of operations described below correspond to various embodiments described above. These exemplary methods can be used cooperatively to provide various exemplary benefits and/or advantages. Although FIGS. 11-12 show specific blocks in a particular order, the operations of the respective methods can be performed in different orders than shown and can be combined and/or divided into blocks having different functionality than shown. Optional blocks or operations are indicated by dashed lines.

In particular, FIG. 11 shows an exemplary method (e.g., procedure) for a first network node configured to operate as a child node of a second network node in an IAB network. The exemplary method can be performed by a network node (e.g., IAB node) such as described elsewhere herein.

The exemplary method can include the operations of block 1110, where the first network node can receive, from the second network node, an indication (TΔ-mode) of a timing offset between the second network node's downlink (DL) transmission timing and the second network node's uplink (UL) reception timing. The exemplary method can also include the operations of block 1120, where the first network node can determine the following based on the indication:

a particular timing mode (Tmode) used (e.g., currently and/or recently) for communication between the first and second network nodes, wherein Tmode is one of a plurality of available timing modes; and a particular timing offset (TΔ) that is applicable to Tmode.

The exemplary method can also include the operations of block 1130, where the first network node can adjust its DL transmission timing based on TΔ.

In some embodiments, the indication can be received in a MAC CE. Two exemplary MAC CEs are shown in FIGS. 9-10.

In some embodiments, determining Tmode in block 1120 includes the operations of sub-block 1121, where the first network node can determine that Tmode is a first one of the available timing modes when a function of TΔ, f(TΔ), is less than a threshold. In some of these embodiments, determining Tmode in block 1120 also includes the operations of sub-block 1122, where the first network node can determine that Tmode is a second one of the available timing modes when f(TΔ) is not less than the threshold.

In some of these embodiments, the first available timing mode is Case-1 and the second available timing mode is either Case-6 or Case-7. Put differently, these embodiments can distinguish between Case-1 and not Case-1 based on the threshold and a function of TΔ, which is indicated by the indication. In other of these embodiments, the first available timing mode is Case-6 and the second available timing mode is either Case-1 or Case-7.

In other embodiments, the indication includes first and second portions, the first portion indication indicates TΔ, and at least one of the first and second portions indicates Tmode. In some cases, the first and second portions can be disjoint. In some of these embodiments, the plurality of available timing modes include the first available timing mode and at least two other available timing modes. In such embodiments, determining Tmode in block 1120 includes the following operations labelled with corresponding sub-block numbers:

- (1123) determining that Tmode is the first available timing mode when a function of TΔ, f(TΔ), is less than a threshold; and
- (1124) when f(TΔ) is not less than the threshold, determining that Tmode is one of the at least two other available timing modes and selecting Tmode from the at least two other available timing modes based on the second portion of the indication.

As an example, the first available timing mode is Case-1 and the at least two other available timing modes include Case-6 and Case-7. As another example, the first available timing mode is Case-6 and the at least two other available timing modes include Case-1 and Case-7.

In some embodiments, the function of TΔ, f(TΔ), is equal to TΔ. In some embodiments, the threshold can be preconfigured in the first network node and the second network node, e.g., based on a 3GPP specification. In other embodiments, the threshold can be received by the first network node from the second network node, e.g., via RRC.

In some embodiments, the adjusting operations of block 1130 can include the operations of sub-blocks 1131-1132. In sub-block 1131, the first network node can determine a timing advance value (TAmode), associated with Tmode, for the first network node's UL transmission timing relative to the first network node's DL reception timing. In sub-block 1132, the first network node can set its DL transmission timing in advance of its DL reception timing based on a function of TAmode. An exemplary function of TAmode is shown in equation (1) above.

In some embodiments, Tmode is determined to be Case-6 (e.g., in block 1120) and the exemplary method can also include the operations of block 1140, where the first network node can adjust its UL transmission timing to align with its DL transmission timing. In some of these embodiments, the exemplary method can also include the operations of block 1150, where the first network node can perform an UL transmission to the second network node based on the adjusted UL transmission timing.

In addition, FIG. 12 shows an exemplary method (e.g., procedure) for a second network node configured to operate as a parent node of a first network node in an IAB network. The exemplary method can be performed by a network node (e.g., IAB node) such as described elsewhere herein.

The exemplary method can include the operations of block 1220, where the second network node can send, to the first network node, an indication (TΔ-mode) of a timing offset between the second network node's downlink (DL) transmission timing and the second network node's uplink (UL) reception timing. The indication can include a representation of the following:

- a particular timing mode (Tmode) used (e.g., currently and/or recently) for communication between the first and second network nodes, wherein Tmode is one of a plurality of available timing modes; and
- a particular timing offset (TΔ) that is applicable to Tmode.

In some embodiments, the exemplary method can also include the operations of block 1230, where the second network node can perform at least one DL transmission to the first network node and receive at least one UL transmission from the first network node based on TΔ and Tmode.

In some embodiments, the indication can be sent in a MAC CE. Two exemplary MAC CEs are shown in FIGS. 9-10.

In some embodiments, the indication indicates that Tmode is a first one of the available timing modes based on a function of TΔ, f(TΔ), being less than a threshold. In some of these embodiments, the indication indicates that Tmode is a second one of the available timing modes based on f(TΔ) being not less than the threshold.

In some of these embodiments, the first available timing mode is Case-1 and the second available timing mode is either Case-6 or Case-7. Put differently, these embodiments enable the first network node to distinguish between Case-1 and not Case-1 (i.e., one other case) based on the threshold and a function of TΔ, which is indicated by the indication. In other of these embodiments, the first available timing mode is Case-6 and the second available timing mode is either Case-1 or Case-7.

In other embodiments, the indication includes first and second portions, the first portion indication indicates TΔ, and at least one of the first and second portions indicates Tmode. In some cases, the first and second portions can be disjoint. In some of these embodiments, the plurality of available timing modes include the first available timing mode and at least two other available timing modes. In such embodiments, when a function of TΔ, f(TΔ), is less than a threshold, the first portion indicates that Tmode is the first available timing mode, and when f(TΔ) is not less than the threshold, the second portion indicates one of the at least two other available timing modes as Tmode. As an example, the first available timing mode is Case-1 and the at least two other available timing modes include Case-6 and Case-7. Put differently, these embodiments enable the first network node to distinguish between Case-1, Case-6, and Case-7 based on the first and second portions of the indication. As another example, the first available timing mode is Case-6 and the at least two other available timing modes include Case-1 and Case-7.

In some embodiments, the function of TΔ, f(TΔ), is equal to TΔ. In some embodiments, the threshold can be preconfigured in the first network node and the second network node, e.g., based on a 3GPP specification. In other embodiments, the threshold can be sent by the second network node to the first network node, e.g., via RRC.

In some embodiments, the exemplary method can also include the operations of block 1210, where the second network node can determine TΔ (e.g., indicated in block 1220) based on a function of the second network node's DL transmission timing and of the second network node's UL reception timing. An example function is shown in equation (2) above.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 13:
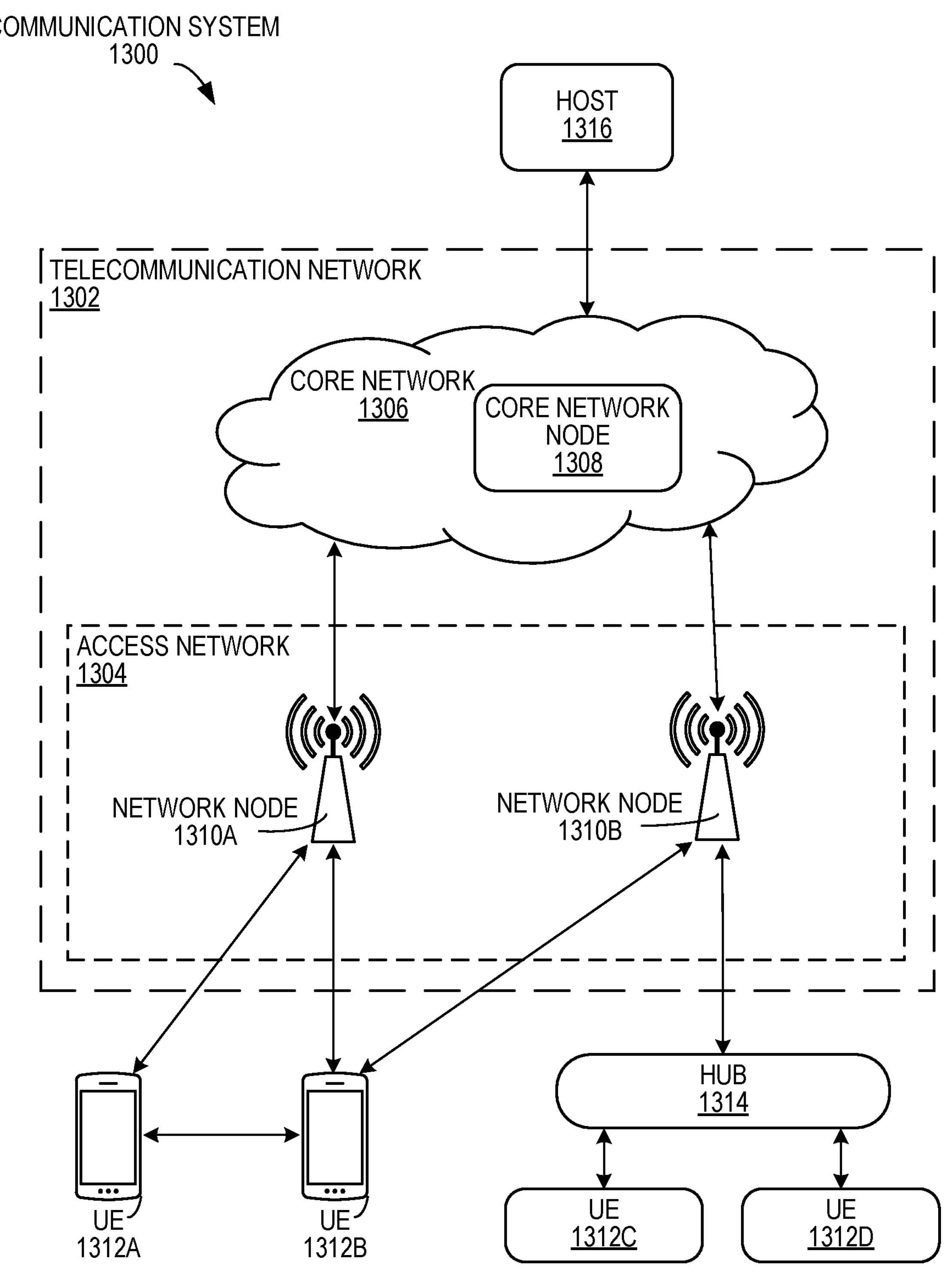
FIG. 13 shows a communication system according to various embodiments of the present disclosure.

FIG. 13 shows an example of a communication system 1300 in accordance with some embodiments. In this example, the communication system 1300 includes a telecommunication network 1302 that includes an access network 1304, such as a radio access network (RAN), and a core network 1306, which includes one or more core network nodes 1308. The access network 1304 includes one or more access network nodes, such as network nodes 1310*a* and 1310*b* (one or more of which may be generally referred to as network nodes 1310), or any other similar 3GPP access node or non-3GPP access point. The network nodes 1310 facilitate direct or indirect connection of user equipment (UE), such as by connecting UEs 1312*a*, 1312*b*, 1312*c*, and 1312*d* (one or more of which may be generally referred to as UEs 1312) to the core network 1306 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1300 may include any number of wired or wireless networks, network nodes, UEs, and/or any other components or systems that may facilitate or participate in the communication of data and/or signals whether via wired or wireless connections. The communication system 1300 may include and/or interface with any type of communication, telecommunication, data, cellular, radio network, and/or other similar type of system.

The UEs 1312 may be any of a wide variety of communication devices, including wireless devices arranged, configured, and/or operable to communicate wirelessly with the network nodes 1310 and other communication devices. Similarly, the network nodes 1310 are arranged, capable, configured, and/or operable to communicate directly or indirectly with the UEs 1312 and/or with other network nodes or equipment in the telecommunication network 1302 to enable and/or provide network access, such as wireless network access, and/or to perform other functions, such as administration in the telecommunication network 1302.

In the depicted example, the core network 1306 connects the network nodes 1310 to one or more hosts, such as host 1316. These connections may be direct or indirect via one or more intermediary networks or devices. In other examples, network nodes may be directly coupled to hosts. The core network 1306 includes one more core network nodes (e.g., core network node 1308) that are structured with hardware and software components. Features of these components may be substantially similar to those described with respect to the UEs, network nodes, and/or hosts, such that the descriptions thereof are generally applicable to the corresponding components of the core network node 1308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1316 may be under the ownership or control of a service provider other than an operator or provider of the access network 1304 and/or the telecommunication network 1302 and may be operated by the service provider or on behalf of the service provider. The host 1316 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1300 of FIG. 13 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1302 is a cellular network that implements 3GPP standardized features. Accordingly, the telecommunications network 1302 may support network slicing to provide different logical networks to different devices that are connected to the telecommunication network 1302. For example, the telecommunications network 1302 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1312 are configured to transmit and/or receive information without direct human interaction. For instance, a UE may be designed to transmit information to the access network 1304 on a predetermined schedule, when triggered by an internal or external event, or in response to requests from the access network 1304. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1314 communicates with the access network 1304 to facilitate indirect communication between one or more UEs (e.g., UE 1312*c* and/or 1312*d*) and network nodes (e.g., network node 1310*b*). In some examples, the hub 1314 may be a controller, router, content source and analytics, or any of the other communication devices described herein regarding UEs. For example, the hub 1314 may be a broadband router enabling access to the core network 1306 for the UEs. As another example, the hub 1314 may be a controller that sends commands or instructions to one or more actuators in the UEs. Commands or instructions may be received from the UEs, network nodes 1310, or by executable code, script, process, or other instructions in the hub 1314. As another example, the hub 1314 may be a data collector that acts as temporary storage for UE data and, in some embodiments, may perform analysis or other processing of the data. As another example, the hub 1314 may be a content source. For example, for a UE that is a VR headset, display, loudspeaker or other media delivery device, the hub 1314 may retrieve VR assets, video, audio, or other media or data related to sensory information via a network node, which the hub 1314 then provides to the UE either directly, after performing local processing, and/or after adding additional local content. In still another example, the hub 1314 acts as a proxy server or orchestrator for the UEs, in particular in if one or more of the UEs are low energy IoT devices.

The hub 1314 may have a constant/persistent or intermittent connection to the network node 1310*b*. The hub 1314 may also allow for a different communication scheme and/or schedule between the hub 1314 and UEs (e.g., UE 1312*c* and/or 1312*d*), and between the hub 1314 and the core network 1306. In other examples, the hub 1314 is connected to the core network 1306 and/or one or more UEs via a wired connection. Moreover, the hub 1314 may be configured to connect to an M2M service provider over the access network 1304 and/or to another UE over a direct connection. In some scenarios, UEs may establish a wireless connection with the network nodes 1310 while still connected via the hub 1314 via a wired or wireless connection. In some embodiments, the hub 1314 may be a dedicated hub—that is, a hub whose primary function is to route communications to/from the UEs from/to the network node 1310*b*. In other embodiments, the hub 1314 may be a non-dedicated hub—that is, a device which is capable of operating to route communications between the UEs and network node 1310*b*, but which is additionally capable of operating as a communication start and/or end point for certain data channels.

Figure 14:
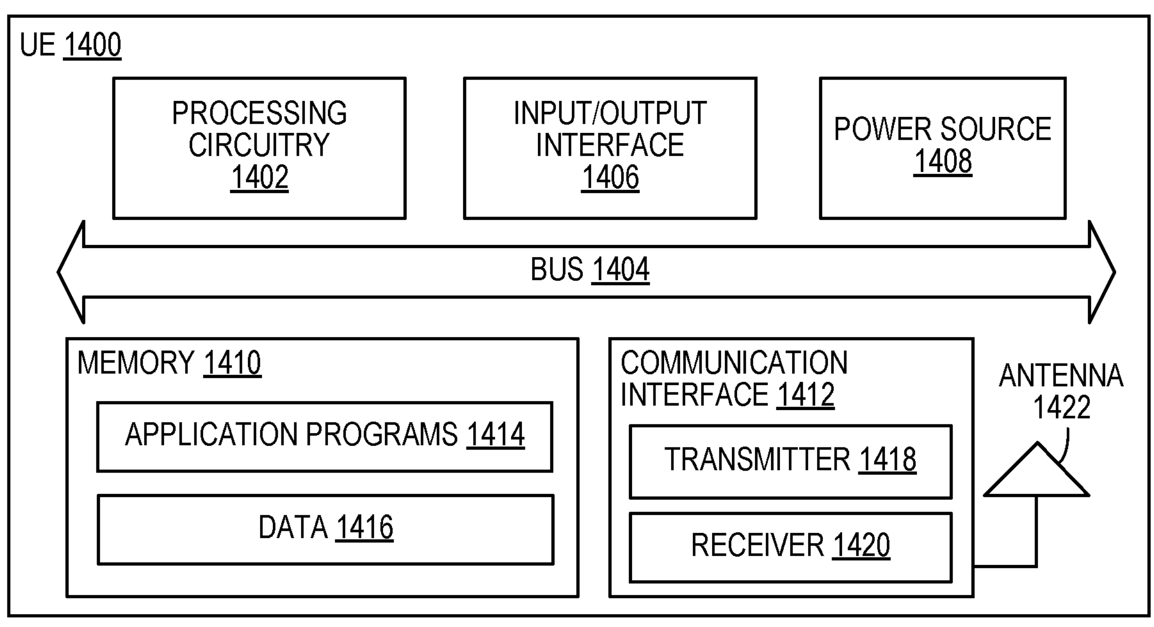
FIG. 14 shows a UE according to various embodiments of the present disclosure.

FIG. 14 shows a UE 1400 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1400 includes processing circuitry 1402 that is operatively coupled via a bus 1404 to an input/output interface 1406, a power source 1408, a memory 1410, a communication interface 1412, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry 1402 is configured to process instructions and data and may be configured to implement any sequential state machine operative to execute instructions stored as machine-readable computer programs in the memory 1410. The processing circuitry 1402 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1402 may include multiple central processing units (CPUs).

In the example, the input/output interface 1406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1408 is structured as a battery or battery pack. Other types of power sources, such as an external power source (e.g., an electricity outlet), photovoltaic device, or power cell, may be used. The power source 1408 may further include power circuitry for delivering power from the power source 1408 itself, and/or an external power source, to the various parts of the UE 1400 via input circuitry or an interface such as an electrical power cable. Delivering power may be, for example, for charging of the power source 1408. Power circuitry may perform any formatting, converting, or other modification to the power from the power source 1408 to make the power suitable for the respective components of the UE 1400 to which power is supplied.

The memory 1410 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1410 includes one or more application programs 1414, such as an operating system, web browser application, a widget, gadget engine, or other application, and corresponding data 1416. The memory 1410 may store, for use by the UE 1400, any of a variety of various operating systems or combinations of operating systems.

The memory 1410 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1410 may allow the UE 1400 to access instructions, application programs and the like, stored on transitory or non-transitory memory media, to off-load data, or to upload data. An article of manufacture, such as one utilizing a communication system may be tangibly embodied as or in the memory 1410, which may be or comprise a device-readable storage medium.

The processing circuitry 1402 may be configured to communicate with an access network or other network using the communication interface 1412. The communication interface 1412 may comprise one or more communication subsystems and may include or be communicatively coupled to an antenna 1422. The communication interface 1412 may include one or more transceivers used to communicate, such as by communicating with one or more remote transceivers of another device capable of wireless communication (e.g., another UE or a network node in an access network). Each transceiver may include a transmitter 1418 and/or a receiver 1420 appropriate to provide network communications (e.g., optical, electrical, frequency allocations, and so forth). Moreover, the transmitter 1418 and receiver 1420 may be coupled to one or more antennas (e.g., antenna 1422) and may share circuit components, software or firmware, or alternatively be implemented separately.

In the illustrated embodiment, communication functions of the communication interface 1412 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1412, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1400 shown in FIG. 14.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a particular use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 15:
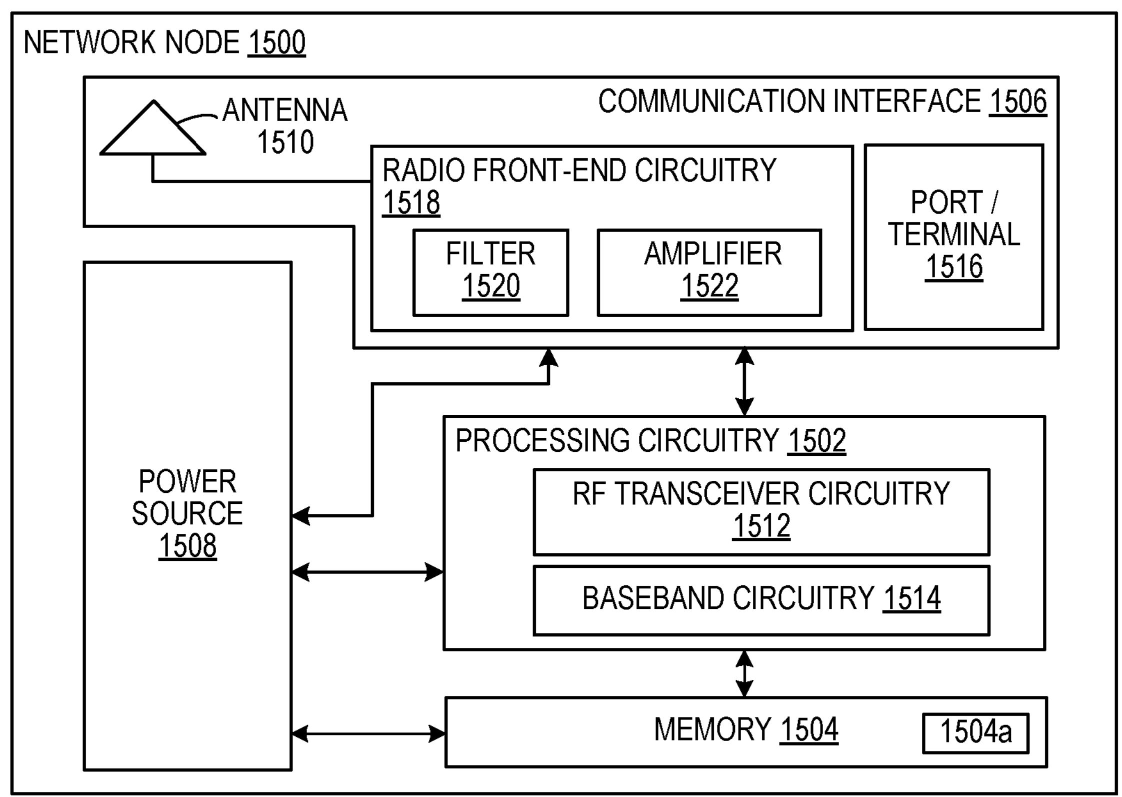
FIG. 15 shows a network node according to various embodiments of the present disclosure.

FIG. 15 shows a network node 1500 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1500 includes a processing circuitry 1502, a memory 1504, a communication interface 1506, and a power source 1508. The network node 1500 may be composed of multiple physically separate components (e.g., a NodeB component and a RNC component, or a BTS component and a BSC component, etc.), which may each have their own respective components. In certain scenarios in which the network node 1500 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1500 may be configured to support multiple radio access technologies (RATs). In such embodiments, some components may be duplicated (e.g., separate memory 1504 for different RATs) and some components may be reused (e.g., a same antenna 1510 may be shared by different RATs). The network node 1500 may also include multiple sets of the various illustrated components for different wireless technologies integrated into network node 1500, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1500.

The processing circuitry 1502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1500 components, such as the memory 1504, to provide network node 1500 functionality.

In some embodiments, the processing circuitry 1502 includes a system on a chip (SOC). In some embodiments, the processing circuitry 1502 includes one or more of radio frequency (RF) transceiver circuitry 1512 and baseband processing circuitry 1514. In some embodiments, the radio frequency (RF) transceiver circuitry 1512 and the baseband processing circuitry 1514 may be on separate chips (or sets of chips), boards, or units, such as radio units and digital units. In alternative embodiments, part or all of RF transceiver circuitry 1512 and baseband processing circuitry 1514 may be on the same chip or set of chips, boards, or units.

The memory 1504 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1502. The memory 1504 may store any suitable instructions, data, or information, including a computer program, software, an application including one or more of logic, rules, code, tables, and/or other instructions (denoted collectively as computer program product 1504*a*) capable of being executed by the processing circuitry 1502 and utilized by the network node 1500. The memory 1504 may be used to store any calculations made by the processing circuitry 1502 and/or any data received via the communication interface 1506. In some embodiments, the processing circuitry 1502 and memory 1504 is integrated.

The communication interface 1506 is used in wired or wireless communication of signaling and/or data between a network node, access network, and/or UE. As illustrated, the communication interface 1506 comprises port(s)/terminal(s) 1516 to send and receive data, for example to and from a network over a wired connection. The communication interface 1506 also includes radio front-end circuitry 1518 that may be coupled to, or in certain embodiments a part of, the antenna 20) 1510. Radio front-end circuitry 1518 comprises filters 1520 and amplifiers 1522. The radio front-end circuitry 1518 may be connected to an antenna 1510 and processing circuitry 1502. The radio front-end circuitry may be configured to condition signals communicated between antenna 1510 and processing circuitry 1502. The radio front-end circuitry 1518 may receive digital data that is to be sent out to other network nodes or UEs via a wireless connection. The radio front-end circuitry 1518 may convert the digital data into a radio signal having the appropriate channel and bandwidth parameters using a combination of filters 1520 and/or amplifiers 1522. The radio signal may then be transmitted via the antenna 1510. Similarly, when receiving data, the antenna 1510 may collect radio signals which are then converted into digital data by the radio front-end circuitry 1518. The digital data may be passed to the processing circuitry 1502. In other embodiments, the communication interface may comprise different components and/or different combinations of components.

In certain alternative embodiments, the network node 1500 does not include separate radio front-end circuitry 1518, instead, the processing circuitry 1502 includes radio front-end circuitry and is connected to the antenna 1510. Similarly, in some embodiments, all or some of the RF transceiver circuitry 1512 is part of the communication interface 1506. In still other embodiments, the communication interface 1506 includes one or more ports or terminals 1516, the radio front-end circuitry 1518, and the RF transceiver circuitry 1512, as part of a radio unit (not shown), and the communication interface 1506 communicates with the baseband processing circuitry 1514, which is part of a digital unit (not shown).

The antenna 1510 may include one or more antennas, or antenna arrays, configured to send and/or receive wireless signals. The antenna 1510 may be coupled to the radio front-end circuitry 1518 and may be any type of antenna capable of transmitting and receiving data and/or signals wirelessly. In certain embodiments, the antenna 1510 is separate from the network node 1500 and connectable to the network node 1500 through an interface or port.

The antenna 1510, communication interface 1506, and/or the processing circuitry 1502 may be configured to perform any receiving operations and/or certain obtaining operations described herein as being performed by the network node. Any information, data and/or signals may be received from a UE, another network node and/or any other network equipment. Similarly, the antenna 1510, the communication interface 1506, and/or the processing circuitry 1502 may be configured to perform any transmitting operations described herein as being performed by the network node. Any information, data and/or signals may be transmitted to a UE, another network node and/or any other network equipment.

The power source 1508 provides power to the various components of network node 1500 in a form suitable for the respective components (e.g., at a voltage and current level needed for each respective component). The power source 1508 may further comprise, or be coupled to, power management circuitry to supply the components of the network node 1500 with power for performing the functionality described herein. For example, the network node 1500 may be connectable to an external power source (e.g., the power grid, an electricity outlet) via an input circuitry or interface such as an electrical cable, whereby the external power source supplies power to power circuitry of the power source 1508. As a further example, the power source 1508 may comprise a source of power in the form of a battery or battery pack which is connected to, or integrated in, power circuitry. The battery may provide backup power should the external power source fail.

Embodiments of the network node 1500 may include additional components beyond those shown in FIG. 15 for providing certain aspects of the network node's functionality, including any of the functionality described herein and/or any functionality necessary to support the subject matter described herein. For example, the network node 1500 may include user interface equipment to allow input of information into the network node 1500 and to allow output of information from the network node 1500. This may allow a user to perform diagnostic, maintenance, repair, and other administrative functions for the network node 1500.

Figure 16:
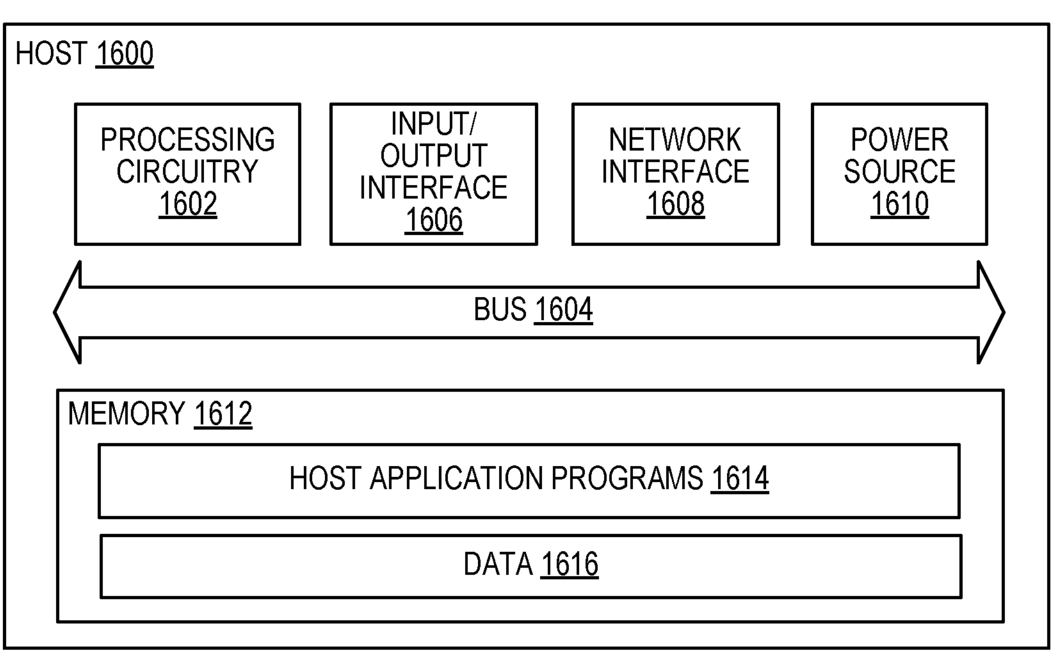
FIG. 16 shows host computing system according to various embodiments of the present disclosure.

FIG. 16 is a block diagram of a host 1600, which may be an embodiment of the host 1316 of FIG. 13, in accordance with various aspects described herein. As used herein, the host 1600 may be or comprise various combinations hardware and/or software, including a standalone server, a blade server, a cloud-implemented server, a distributed server, a virtual machine, container, or processing resources in a server farm. The host 1600 may provide one or more services to one or more UEs.

The host 1600 includes processing circuitry 1602 that is operatively coupled via a bus 1604 to an input/output interface 1606, a network interface 1608, a power source 1610, and a memory 1612. Other components may be included in other embodiments. Features of these components may be substantially similar to those described with respect to the devices of previous figures, such as FIGS. 14 and 15, such that the descriptions thereof are generally applicable to the corresponding components of host 1600.

The memory 1612 may include one or more computer programs including one or more host application programs 1614 and data 1616, which may include user data, e.g., data generated by a UE for the host 1600 or data generated by the host 1600 for a UE. Embodiments of the host 1600 may utilize only a subset or all of the components shown. The host application programs 1614 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1614 may also provide for user authentication and licensing checks and may periodically report health, routes, and content availability to a central node, such as a device in or on the edge of a core network. Accordingly, the host 1600 may select and/or indicate a different host for over-the-top services for a UE. The host application programs 1614 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 17:
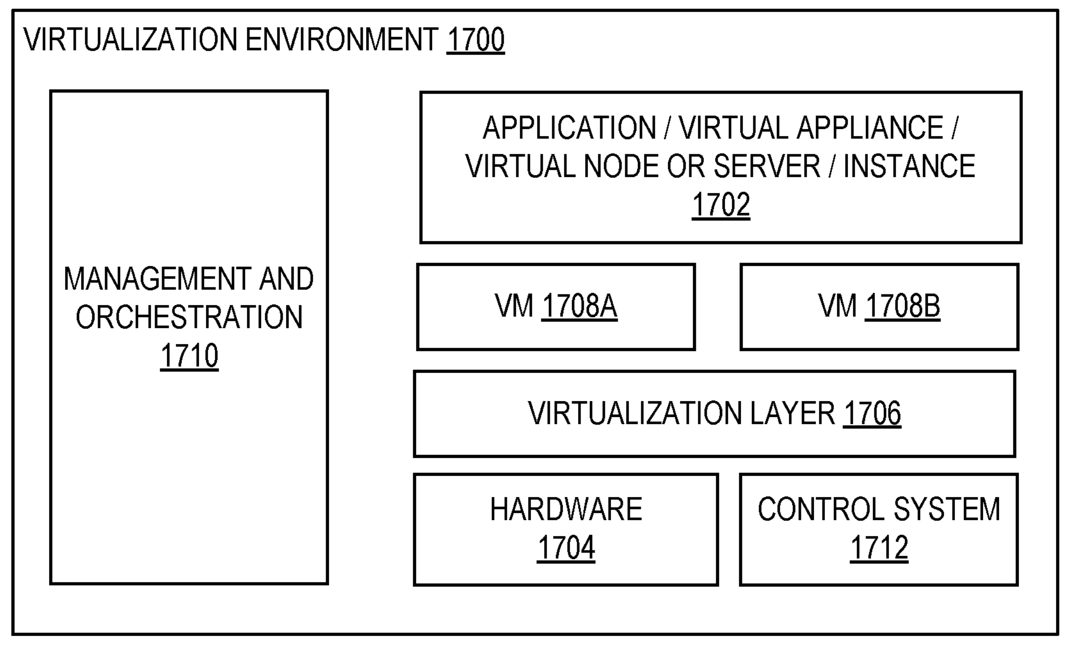
FIG. 17 is a block diagram of a virtualization environment in which functions implemented by some embodiments of the present disclosure may be virtualized.

FIG. 17 is a block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1700 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1702 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1704 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1706 (also referred to as hypervisors or virtual machine monitors (VMMs)), provide VMs 1708*a* and 1708*b* (one or more of which may be generally referred to as VMs 1708), and/or perform any of the functions, features and/or benefits described in relation with some embodiments described herein. The virtualization layer 1706 may present a virtual operating platform that appears like networking hardware to the VMs 1708.

The VMs 1708 comprise virtual processing, virtual memory, virtual networking or interface and virtual storage, and may be run by a corresponding virtualization layer 1706. Different embodiments of the instance of a virtual appliance 1702 may be implemented on one or more of VMs 1708, and the implementations may be made in various ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1708 may be a software implementation of a physical machine that runs programs as if they were executing on a physical, non-virtualized machine. Each of the VMs 1708, and that part of hardware 1704 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1708 on top of the hardware 1704 and corresponds to the application 1702.

Hardware 1704 may be implemented in a standalone network node with generic or specific components. Hardware 1704 may implement some functions via virtualization. Alternatively, hardware 1704 may be part of a larger cluster of hardware (e.g., such as in a data center or CPE) where many hardware nodes work together and are managed via management and orchestration 1710, which, among others, oversees lifecycle management of applications 1702. In some embodiments, hardware 1704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1712 which may alternatively be used for communication between hardware nodes and radio units.

Figure 18:
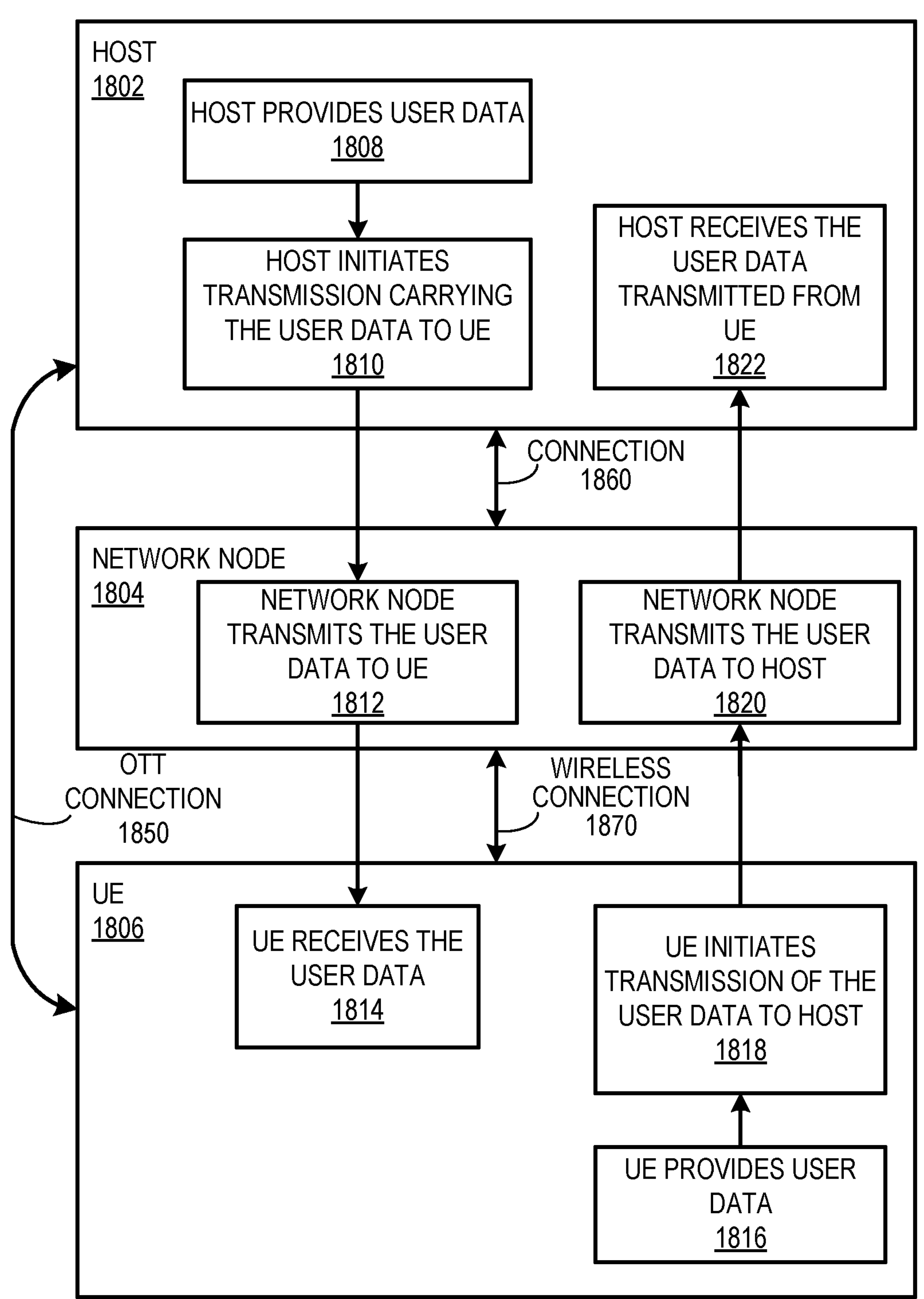
FIG. 18 illustrates communication between a host computing system, a network node, and a UE via multiple connections, at least one of which is wireless, according to various embodiments of the present disclosure.

FIG. 18 shows a communication diagram of a host 1802 communicating via a network node 1804 with a UE 1806 over a partially wireless connection in accordance with some embodiments. Example implementations, in accordance with various embodiments, of the UE (such as a UE 1312*a* of FIG. 13 and/or UE 1400 of FIG. 14), network node (such as network node 1310*a* of FIG. 13 and/or network node 1500 of FIG. 15), and host (such as host 1316 of FIG. 13 and/or host 1600 of FIG. 16) discussed in the preceding paragraphs will now be described with reference to FIG. 18.

Like host 1600, embodiments of host 1802 include hardware, such as a communication interface, processing circuitry, and memory. The host 1802 also includes software, which is stored in or accessible by the host 1802 and executable by the processing circuitry. The software includes a host application that may be operable to provide a service to a remote user, such as the UE 1806 connecting via an over-the-top (OTT) connection 1850 extending between the UE 1806 and host 1802. In providing the service to the remote user, a host application may provide user data which is transmitted using the OTT connection 1850.

The network node 1804 includes hardware enabling it to communicate with the host 1802 and UE 1806. The connection 1860 may be direct or pass through a core network (like core network 1306 of FIG. 13) and/or one or more other intermediate networks, such as one or more public, private, or hosted networks. For example, an intermediate network may be a backbone network or the Internet.

The UE 1806 includes hardware and software, which is stored in or accessible by UE 1806 and executable by the UE's processing circuitry. The software includes a client application, such as a web browser or operator-specific "app" that may be operable to provide a service to a human or non-human user via UE 1806 with the support of the host 1802. In the host 1802, an executing host application may communicate with the executing client application via the OTT connection 1850 terminating at the UE 1806 and host 1802. In providing the service to the user, the UE's client application may receive request data from the host's host application and provide user data in response to the request data. The OTT connection 1850 may transfer both the request data and the user data. The UE's client application may interact with the user to generate the user data that it provides to the host application through the OTT connection 1850.

The OTT connection 1850 may extend via a connection 1860 between the host 1802 and the network node 1804 and via a wireless connection 1870 between the network node 1804 and the UE 1806 to provide the connection between the host 1802 and the UE 1806. The connection 1860 and wireless connection 1870, over which the OTT connection 1850 may be provided, have been drawn abstractly to illustrate the communication between the host 1802 and the UE 1806 via the network node 1804, without explicit reference to any intermediary devices and the precise routing of messages via these devices.

As an example of transmitting data via the OTT connection 1850, in step 1808, the host 1802 provides user data, which may be performed by executing a host application. In some embodiments, the user data is associated with a particular human user interacting with the UE 1806. In other embodiments, the user data is associated with a UE 1806 that shares data with the host 1802 without explicit human interaction. In step 1810, the host 1802 initiates a transmission carrying the user data towards the UE 1806. The host 1802 may initiate the transmission responsive to a request transmitted by the UE 1806. The request may be caused by human interaction with the UE 1806 or by operation of the client application executing on the UE 1806. The transmission may pass via the network node 1804, in accordance with the teachings of the embodiments described throughout this disclosure. Accordingly, in step 1812, the network node 1804 transmits to the UE 1806 the user data that was carried in the transmission that the host 1802 initiated, in accordance with the teachings of the embodiments described throughout this disclosure. In step 1814, the UE 1806 receives the user data carried in the transmission, which may be performed by a client application executed on the UE 1806 associated with the host application executed by the host 1802.

In some examples, the UE 1806 executes a client application which provides user data to the host 1802. The user data may be provided in reaction or response to the data received from the host 1802. Accordingly, in step 1816, the UE 1806 may provide user data, which may be performed by executing the client application. In providing the user data, the client application may further consider user input received from the user via an input/output interface of the UE 1806. Regardless of the specific manner in which the user data was provided, the UE 1806 initiates, in step 1818, transmission of the user data towards the host 1802 via the network node 1804. In step 1820, in accordance with the teachings of the embodiments described throughout this disclosure, the network node 1804 receives user data from the UE 1806 and initiates transmission of the received user data towards the host 1802. In step 1822, the host 1802 receives the user data carried in the transmission initiated by the UE 1806.

One or more of the various embodiments improve the performance of OTT services provided to the UE 1806 using the OTT connection 1850, in which the wireless connection 1870 forms the last segment. More precisely, embodiments of the present disclosure can avoid misinterpretation of the timing information provided by the parent node, and consequently avoid erroneous adjustments of the IAB node's UL and/or DL transmission timing based on such timing information. Accordingly, such techniques facilitate proper operation of an IAB network when any of multiple available timing modes are in use. This can facilitate more reliable delivery of OTT services over networks that employ IAB, which increases the value of such services to end users and service providers.

In an example scenario, factory status information may be collected and analyzed by the host 1802. As another example, the host 1802 may process audio and video data which may have been retrieved from a UE for use in creating maps. As another example, the host 1802 may collect and analyze real-time data to assist in controlling vehicle congestion (e.g., controlling traffic lights). As another example, the host 1802 may store surveillance video uploaded by a UE. As another example, the host 1802 may store or control access to media content such as video, audio, VR or AR which it can broadcast, multicast or unicast to UEs. As other examples, the host 1802 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1850 between the host 1802 and UE 1806, in response to variations in the measurement results. The measurement procedure and/or the network functionality for reconfiguring the OTT connection may be implemented in software and hardware of the host 1802 and/or UE 1806. In some embodiments, sensors (not shown) may be deployed in or in association with other devices through which the OTT connection 1850 passes; the sensors may participate in the measurement procedure by supplying values of the monitored quantities exemplified above or supplying values of other physical quantities from which software may compute or estimate the monitored quantities. The reconfiguring of the OTT connection 1850 may include message format, retransmission settings, preferred routing etc.; the reconfiguring need not directly alter the operation of the network node 1804. Such procedures and functionalities may be known and practiced in the art. In certain embodiments, measurements may involve proprietary UE signaling that facilitates measurements of throughput, propagation times, latency and the like, by the host 1802. The measurements may be implemented in that software causes messages to be transmitted, in particular empty or 'dummy' messages, using the OTT connection 1850 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method for a first network node configured to operate as a child node of a second network node in an integrated access backhaul (IAB) network, the method comprising:
- receiving, from the second network node, an indication (TΔ-mode) of a timing offset between the second network node's downlink (DL) transmission timing and the second network node's uplink (UL) reception timing;
- determining the following based on the indication:
  - a particular timing mode (Tmode) to be used for communication between the first and second network nodes, wherein Tmode is one of a plurality of available timing modes; and
  - a particular timing offset (TΔ) that is applicable to Tmode; and
- adjusting the first network node's DL transmission timing based on TΔ.

A2. The method of embodiment A1, where determining TΔ is based on a first portion of the indication.

A3. The method of embodiment A2, wherein determining Tmode is based on a second portion of the indication.

A4. The method of embodiment A3, wherein the first and second portions are disjoint.

A5. The method of embodiment A2, wherein determining Tmode is based on comparing TΔ to a threshold.

A6. The method of embodiment A5, wherein determining Tmode comprises determining that Tmode is a first one of the available timing modes when a function of TΔ, f(TΔ), is less than the threshold.

A7. The method of embodiment A6, wherein f(TΔ) is equal to TΔ.

A8. The method of any of embodiments A6-A7, wherein the first available timing mode is Case-1.

A9. The method of any of embodiments A6-A8, wherein determining Tmode further comprises determining that Tmode is a second one of the available timing modes when f(TΔ) is not less than the threshold.

A10. The method of embodiment A9, wherein the second available timing mode is one of the following: Case-6 and Case-7.

A11. The method of embodiment A6, wherein:
- the plurality of available timing modes include the first available timing mode and at least two other available timing modes; and
- determining Tmode further comprises:
  - determining that Tmode is one of the at least two other available timing modes when f(TΔ) is not less than the threshold; and
  - selecting Tmode from the at least two other available timing modes based on the second portion of the indication.

A12. The method of embodiment A11, wherein the at least two other available timing modes include Case-6 and Case-7.

A13. The method of any of embodiments A5-A12, wherein the threshold is one of the following: preconfigured in the first network node and the second network node, or received by the first network node from the second network node.

A14. The method of any of embodiments A1-A13, wherein adjusting the first network node's DL transmission timing comprises:
- determining a timing advance value (TAmode), associated with Tmode, for the first network node's UL transmission timing relative to the first network node's DL reception timing; and
- setting the first network node's DL transmission timing in advance of the first network node's DL reception timing based on a function of TAmode.

A15. The method of embodiment A14, wherein:
- Tmode is Case-6; and
- the method further comprises adjusting the first network node's UL transmission timing to align with the first network node's DL transmission timing.

A16. The method of embodiment A15, further comprising performing an UL transmission to the second network node based on the adjusted UL transmission timing.

A17. The method of any of embodiments A1-A16, wherein the indication is received in a medium access control (MAC) control element (CE).

B1. A method for a second network node configured to operate as a parent node of a first network node in an integrated access backhaul (IAB) network, the method comprising:
- sending, to the first network node, an indication (TΔ-mode) of a timing offset between the second network node's downlink (DL) transmission timing and the second network node's uplink (UL) reception timing, wherein the indication includes an encoded representation of the following:
  - a particular timing mode (Tmode) to be used for communication between the first and second network nodes, wherein Tmode is one of a plurality of available timing modes; and
  - a particular timing offset (TΔ) that is applicable to Tmode.

B2. The method of embodiment B1, further comprising performing at least one DL transmission to the first network node and receiving at least one UL transmission from the first network node based on TΔ and Tmode.

B3. The method of any of embodiments B1-B2, wherein a first portion of the indication indicates TΔ.

B4. The method of embodiment B3, wherein a second portion of the indication indicates Tmode.

B5. The method of embodiment B4, wherein the first and second portions are disjoint.

B6. The method of embodiment B3, wherein the indication indicates Tmode based on TΔ and a threshold.

B7. The method of embodiment B6, wherein indication indicates that Tmode is a first one of the available timing modes based on a function of TΔ, f(TΔ), being less than the threshold.

B8. The method of embodiment B7, wherein f(TΔ) is equal to TΔ.

B9. The method of any of embodiments B7-B8, wherein the first available timing mode is Case-1.

B10. The method of any of embodiments B7-B9, wherein the indication indicates that Tmode is a second one of the available timing modes based on f(TΔ) being not less than the threshold.

B11. The method of embodiment B10, wherein the second available timing mode is one of the following: Case-6 and Case-7.

B12. The method of embodiment B7, wherein:
- the plurality of available timing modes include the first available timing mode and at least two other available timing modes; and
- when f(TΔ) is not less than the threshold, the second portion of the indication indicates one of the at least two other available timing modes.

B13. The method of embodiment B12, wherein the at least two other available timing modes include Case-6 and Case-7.

B14. The method of any of embodiments B6-B13, wherein the threshold is one of the following: preconfigured in the first network node and the second network node, or sent by the second network node to the first network node.

B15. The method of any of embodiments B1-B14, further comprising determining TΔ based on a function of the second network node's DL transmission timing and the second network node's UL reception timing.

B16. The method of any of embodiments B1-B15, wherein the indication is sent in a medium access control (MAC) control element (CE).

C1. A first network node configured to operate as a child node of a second network node in an integrated access backhaul (IAB) network, the first network node comprising:
- communication interface circuitry configured to communicate with the second network node; and
- processing circuitry operably coupled to the communication interface circuitry, whereby the processing circuitry and the communication interface circuitry are configured to perform operations corresponding to any of the methods of embodiments A1-A17.

C2. A first network node configured to operate as a child node of a second network node in an integrated access backhaul (IAB) network, the first network node being further configured to perform operations corresponding to any of the methods of embodiments A1-A17.

C3. A non-transitory, computer-readable medium storing computer-executable instructions that, when executed by processing circuitry of a first network node configured to operate as a child node of a second network node in an integrated access backhaul (IAB) network, configure the first network node to perform operations corresponding to any of the methods of embodiments A1-A17.

C4. A computer program product comprising computer-executable instructions that, when executed by processing circuitry of a first network node configured to operate as a child node of a second network node in an integrated access backhaul (IAB) network, configure the first network node to perform operations corresponding to any of the methods of embodiments A1-A17.

D1. A second network node configured to operate as a parent node of a first network node in an integrated access backhaul (IAB) network, the second network node comprising:
- communication interface circuitry configured to communicate with the first network node; and
- processing circuitry operably coupled to the communication interface circuitry, whereby the processing circuitry and the communication interface circuitry are configured to perform operations corresponding to any of the methods of embodiments B1-B16.

D2. A second network node configured to operate as a parent node of a first network node in an integrated access backhaul (IAB) network, the second network node being further configured to perform operations corresponding to any of the methods of embodiments B1-B16.

D3. A non-transitory, computer-readable medium storing computer-executable instructions that, when executed by processing circuitry of a second network node configured to operate as a parent node of a first network node in an integrated access backhaul (IAB) network, configure the second network node to perform operations corresponding to any of the methods of embodiments B1-B16.

D4. A computer program product comprising computer-executable instructions that, when executed by processing circuitry of a second network node configured to operate as a parent node of a first network node in an integrated access backhaul (IAB) network, configure the second network node to perform operations corresponding to any of the methods of embodiments B1-B16.

The invention claimed is:

1. A method for a first network node configured to operate as a child node of a second network node in an integrated access backhaul (IAB) network, the method comprising:
- receiving, from the second network node, an indication (TΔ-mode) of a timing offset between the second network node's downlink (DL) transmission timing and the second network node's uplink (UL) reception timing;
- determining the following based on the indication:
  - a particular timing mode (Tmode) used for communication between the first and second network nodes, wherein Tmode is one of a plurality of available timing modes; and
  - a particular timing offset (TΔ) that is applicable to Tmode, wherein Tmode is determined to be a first one of the available timing modes when a function of TΔ (f(TΔ)) is less than a threshold; and adjusting the first network node's DL transmission timing based on TΔ.

2. The method of claim 1, wherein determining Tmode further comprises determining that Tmode is a second one of the available timing modes when f(TΔ) is not less than the threshold.

3. The method of claim 1, wherein the indication includes first and second portions, the first portion indication indicates TΔ, and at least one of the first and second portions indicates Tmode.

4. The method of claim 3, wherein the first and second portions are disjoint.

5. The method of claim 3, wherein:

the plurality of available timing modes include the first available timing mode and at least two other available timing modes; and determining Tmode comprises:

determining that Tmode is the first available timing mode when a function of TΔ (f(TΔ)) is less than a threshold; and when f(TΔ) is not less than the threshold, determining that Tmode is one of the at least two other available timing modes and selecting Tmode from the at least two other available timing modes, based on the second portion of the indication.

6. The method of claim 5, wherein one of the following applies:

the first available timing mode is Case-1 and the at least two other available timing modes include Case-6 and Case-7; or the first available timing mode is Case-6 and the at least two other available timing modes include Case-1 and Case-7.

7. The method of claim 1, wherein f(TΔ) is equal to TΔ.

8. The method of claim 1, wherein adjusting the first network node's DL transmission timing comprises:

determining a timing advance value (TAmode) associated with Tmode, for the first network node's UL transmission timing relative to the first network node's DL reception timing; and setting the first network node's DL transmission timing in advance of the first network node's DL reception timing based on a function of TAmode.

9. A method for a second network node configured to operate as a parent node of a first network node in an integrated access backhaul (IAB) network, the method comprising:

sending, to the first network node, an indication (TA-mode) of a timing offset between the second network node's downlink (DL) transmission timing and the second network node's uplink (UL) reception timing, wherein the indication includes a representation of the following:

a particular timing mode (Tmode) used for communication between the first and second network nodes, wherein Tmode is one of a plurality of available timing modes; and a particular timing offset (TΔ) that is applicable to Tmode, wherein the indication indicates that Tmode is a first one of the available timing modes based on a function of TΔ (f(TΔ)) being less than a threshold.

10. The method of claim 9, further comprising performing at least one DL transmission to the first network node and receiving at least one UL transmission from the first network node based on TΔ and Tmode.

11. The method of claim 9, wherein the indication indicates that Tmode is a second one of the available timing modes based on f(TΔ) being not less than the threshold.

12. The method of claim 9, wherein the indication includes first and second portions, the first portion indication indicates TA, and at least one of the first and second portions indicates Tmode.

13. The method of claim 12, wherein the first and second portions are disjoint.

14. The method of claim 12, wherein:

the plurality of available timing modes include a first available timing mode and at least two other available timing modes;

when a function of TΔ (f(TΔ)) is less than a threshold, the first portion indicates that Tmode is the first available timing mode; and when f(TΔ) is not less than the threshold, the second portion indicates one of the at least two other available timing modes as Tmode.

15. The method of claim 14, wherein one of the following applies:

the first available timing mode is Case-1 and the at least two other available timing modes include Case-6 and Case-7; or the first available timing mode is Case-6 and the at least two other available timing modes include Case-1 and Case-7.

16. The method of claim 9, wherein f(TΔ) is equal to TA.

17. A first network node configured to operate as a child node of a second network node in an integrated access backhaul (IAB) network, the first network node comprising:

processing circuitry and communication interface circuitry arranged as a mobile terminal, (IAB-MT) and as a distributed unit (IAB-DU), wherein the processing circuitry and the communication interface circuitry are further configured to:

receive, from the second network node, an indication (TA-mode) of a timing offset between the second network node's downlink (DL) transmission timing and the second network node's uplink (UL) reception timing;

determine the following based on the indication:

a particular timing mode (Tmode) used for communication between the first and second network nodes, wherein Tmode is one of a plurality of available timing modes; and a particular timing offset (TΔ) that is applicable to Tmode, wherein Tmode is determined to be a first one of the available timing modes when a function of TΔ (f(TΔ)) is less than a threshold; and adjust the first network node's DL transmission timing based on TA.

18. A second network node configured to operate as a parent node of a first network node in an integrated access backhaul (IAB) network, the second network node comprising:

communication interface circuitry configured to communicate with the first network node; and processing circuitry operably coupled to the communication interface circuitry, wherein the processing circuitry and the communication interface circuitry are configured to:

send, to the first network node, an indication (TA-mode) of a timing offset between the second network node's downlink (DL) transmission timing and the second network node's uplink (UL) reception timing, wherein the indication includes a representation of the following:

a particular timing mode (Tmode) used for communication between the first and second network nodes, wherein Tmode is one of a plurality of available timing modes; and a particular timing offset (TΔ) that is applicable to Tmode, wherein the indication indicates that Tmode is a first one of the available timing modes based on a function of TΔ (f(TΔ)) being less than a threshold.

* * * * *